US006511183B2

(12) United States Patent
Shimizu et al.

(10) Patent No.: US 6,511,183 B2
(45) Date of Patent: Jan. 28, 2003

(54) DIGITAL IMAGE PROJECTOR WITH ORIENTED FIXED-POLARIZATION-AXIS POLARIZING BEAMSPLITTER

(75) Inventors: Jeffrey A. Shimizu, Cortlandt Manor, NY (US); Peter J. M. Janssen, Scarborough Manor, NY (US); Stephen McClain, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 9 days.

(21) Appl. No.: 09/873,883

(22) Filed: Jun. 2, 2001

(65) Prior Publication Data

US 2002/0180932 A1 Dec. 5, 2002

(51) Int. Cl.⁷ .............................................. G03B 21/14
(52) U.S. Cl. ............................................. 353/20; 349/9
(58) Field of Search ........................... 353/20, 31, 34, 353/37; 349/5, 8, 9

(56) References Cited

U.S. PATENT DOCUMENTS

| 2,403,731 | A | 7/1946  | MacNeille       |
|-----------|---|---------|-----------------|
| 3,346,319 | A | 10/1967 | Billings        |
| 4,512,638 | A | 4/1985  | Sriram et al.   |
| 5,410,370 | A | 4/1995  | Janssen         |
| 5,453,859 | A | 9/1995  | Sannohe et al.  |
| 5,532,763 | A | 7/1996  | Janssen et al.  |
| 5,608,467 | A | 3/1997  | Janssen et al.  |
| 5,777,789 | A | 7/1998  | Chiu et al.     |
| 5,808,795 | A | 9/1998  | Shimomura et al.|
| 5,986,730 | A | 11/1999 | Hansen et al.   |
| 5,986,809 | A | 11/1999 | Itoh et al.     |
| 6,025,897 | A | 2/2000  | Weber et al.    |
| 6,081,376 | A | 6/2000  | Hansen et al.   |
| 6,108,131 | A | 8/2000  | Hansen et al.   |
| 6,113,239 | A | 9/2000  | Sampsell et al. |
| 6,183,091 | B1 | 2/2001 | Johnson et al.  |
| 6,208,463 | B1 | 3/2001 | Hansen et al.   |
| 6,234,634 | B1 * | 5/2001 | Hansen et al. ................. 353/20 |
| 6,102,659 | A1 * | 8/2002 | Hansen et al. ............... 359/486 |

FOREIGN PATENT DOCUMENTS

| EP | 0 389240 A2   | 9/1990  |
|----|---------------|---------|
| EP | 0 568998 A2   | 11/1993 |
| WO | WO 00/70386 A1| 11/2000 |
| WO | WO 01/09677 A1| 2/2001  |
| WO | WO 01/18570 A1| 3/2001  |

OTHER PUBLICATIONS

C.W. Peters and W.K. Pursley, "The Use of Wire Gratings as Polarizers," *Proceedings of the Optical Society of America* (Nov. 1952) p. 877, paragraph 55.

A.S. Makas and W.A. Shurcliff, "New Arrangement of Silver Chloride Polarizer for the Infrared," *Journal of the Optical Society of America* (Nov. 1955) pp. 998–999, vol. 45.

(List continued on next page.)

Primary Examiner—William Dowling

(57) ABSTRACT

A digital image projector includes an illumination-light source lamp and illumination beam forming optics for forming a white-spectrum illumination beam and color-band-separation optics to divide the illumination beam into color-component subbeams. The digital image projector also includes a reflective digital-image-encoding polarization modulator mechanism such as a reflective liquid crystal display polarization modulator to reflectively modulate the linearly polarized subbeams to form color-component image encoded-polarization subbeams and projection lens optics for projecting a color image divided from the image encoded-polarization subbeams. The digital image projector further includes a plate-supported, surface mounted fixed polarization-axis polarizing beamsplitter such as a wire-grid polarizing beamsplitter for dividing the color image from the image-encoded-polarization subbeams in which a polarizer support plate of the polarizing beamsplitter faces an illumination-source side of the optical system of the projector.

14 Claims, 10 Drawing Sheets

OTHER PUBLICATIONS

G.R. Bird and W.A. Shurcliff, "Pile–of–Plates Polarizers for Infrared: Improvement in Analysis and Design," *Journal of the Optical Society of America* (Mar. 1959) pp. 235–237, vol. 49.

G.R. Bird and M. Parrish, Jr., "The Wire–Grid as Near–Infrared Polarizer," *Journal of the Optical Society of America* (Sep. 1960) pp. 886–891, vol. 50.

J.P. Auton, "Infrared Transmission Polarizers by Photolithography," *Applied Optics* (Jun. 1967) pp. 1023–1027, vol. 6.

J.P. Auton and M.C. Hutley, "Grid Polarizers for Use in the Near Infrared," *Infrared Physics* (1972) pp. 95–100, vol. 12.

A.E. Rosenbluth et al., "Contrast Losses in Projection Displays for Depolarization by Tinted Beam Splitter Coatings," *Proceedings of the International Display Research Conference*, Society for Information Display, (1997) pp. 226–229.

Y. Itoh et al., "Ultra–High–Efficiency LC Projector Using a Polarized Light Illuminating System," *Society for Information Display 97 Digest* (1997) pp. 993–996.

A.E. Rosenbluth et al., "Contrast Properties of Reflecting Liquid Crystal Light Valves in Projection Displays," *IBM Journal of Research Development* (May/Jul. 1998) pp. 359–386, vol. 42.

E. Hecht, *Optics*, 3rd edition (1998) pp. 327–328 and 342–346 (Addison–Wesley).

E.H. Stupp and M.S. Brennesholtz, *Projection Displays* (1998) pp. 133–137 (John Wiley & Son).

B. Schnabel et al., "Study on Polarizing Visible Light by Subwavelength–Period Metal Stripe Gratings," *Optical Engineering* (Feb. 1999) pp. 220–226, vol. 38.*

W. J. Smith, *Modern Optical Egineering*, 3rd edition (2000) pp. 114–117 and 198–200 (McGraw–Hill).

Moxtek, web pages, nine sheets, downloaded May 17, 2001.

* cited by examiner

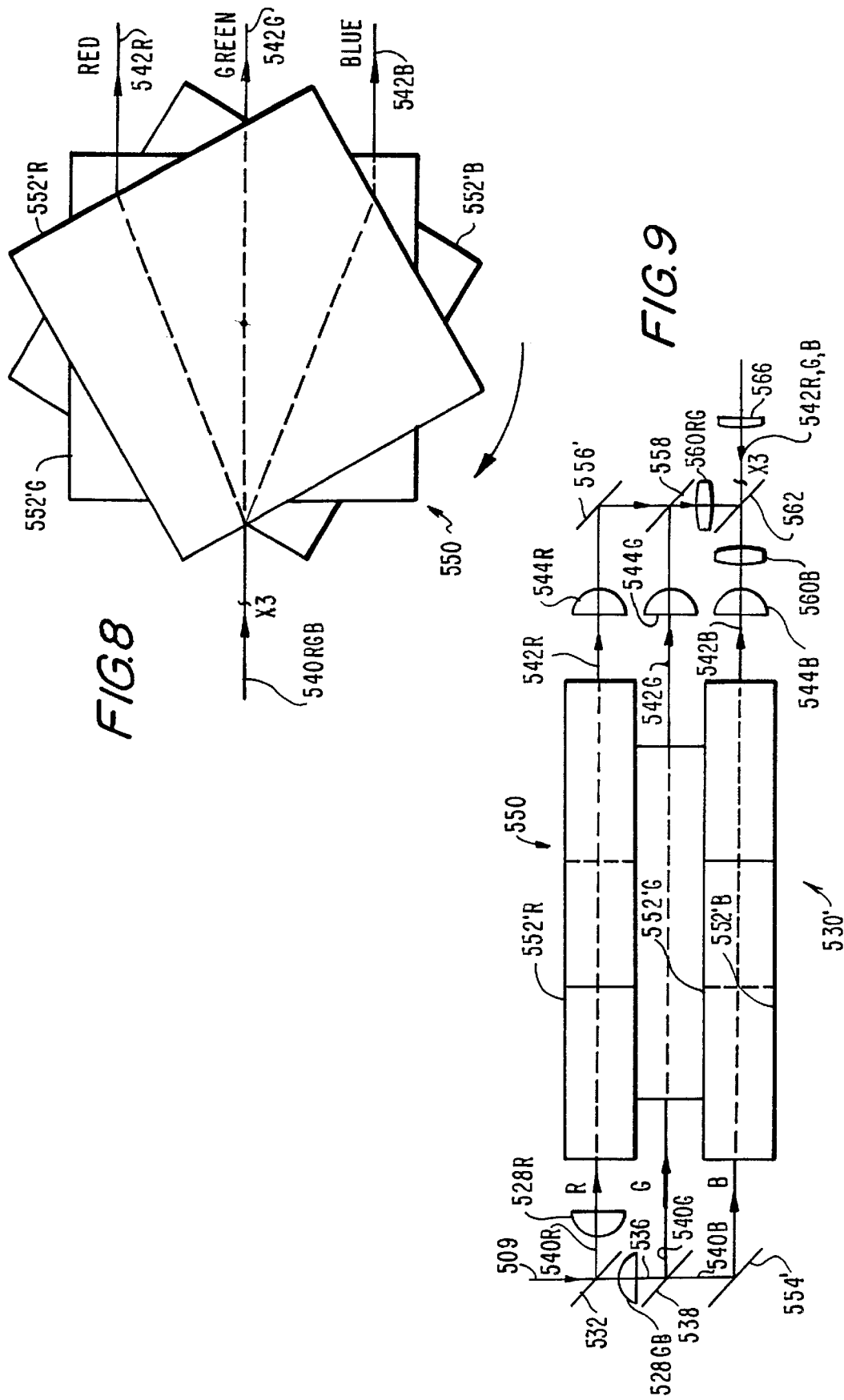

DIGITAL IMAGE PROJECTOR WITH ORIENTED FIXED-POLARIZATION-AXIS POLARIZING BEAMSPLITTER

FIELD OF THE INVENTION

The present invention broadly concerns digital image projectors and more particularly concerns digital image projectors based on reflective digital-image polarization modulators such as reflective liquid-crystal display polarization modulators.

BACKGROUND ART

Digital image projectors are widely used to project color images generated from digital signals encoding the images onto the front of a reflective display screen for a conference-room presentation or the like or onto the rear of a semi-transparent diffusive screen of a rear-projection display monitor or a projection television.

A conventional digital-image projector employing reflective liquid-crystal polarization modulators is disclosed in U.S. Pat. No. 5,777,789 to Chiu et al. The projector of the '789 patent has a metal-halide arc lamp as a source of unpolarized "white" light for the projector. Light from the arc lamp passes through illumination optics which function to form a generally parallel, visible white-light illumination beam of generally uniform intensity spatially with respect to polarization-modulator faces of the liquid-crystal polarization modulators employed in the projector. The unpolarized illumination beam is directed into a polarizing beamsplitter cube, which according to the '789 patent is designed for use over a range of wavelengths of the visible light spectrum and over a range of angular divergence of the beam. The polarizing beamsplitter cube splits the unpolarized beam into two beams of substantially—but, conventionally, not perfectly—polarized light, with the respective polarizations of the two beams being substantially orthogonal. One of the two light beams so produced in the polarizing beamsplitter cube of the digital-image projector of the '789 patent serves as a substantially polarized source beam and is directed from the polarizing beamsplitter cube into a color splitting/combining prism assembly. The color splitting/combining prism assembly is comprised of three prisms with certain of the faces of the prisms bearing dichroic coatings for sequentially separating red, blue, and green light components from the visible white light of the substantially polarized source beam and directing each substantially polarized color-component light beam onto a corresponding reflective liquid-crystal polarization modulator—referred to as a "light valve" in the '789 patent.

Each of the three polarization modulators of the digital-image projector of the '789 patent is positioned with a reflective polarization-modulator face perpendicular to a component-beam optical path defined with respect to the corresponding substantially polarized color-component light beam exiting the color splitting/combining prism assembly. In general, a reflective polarization modulator serves to modulate the polarization of the corresponding color-component light beam spatially by means of selective rotation of the polarization of the light of the beam on a pixel-by-pixel basis over the polarization-modulator face in accordance with a signal applied to the polarization modulator which encodes a component color image of a desired composite color image. In particular, for each pixel of the projected image which is to be illuminated in a given color, the polarization of the substantially polarized color-component light beam of that color is rotated by the reflective liquid-crystal polarization modulator at a location on the polarization-modulator face corresponding to the location of the pixel in the projected image. Such illuminated pixels are referred to as "light" pixels. Conversely, for each pixel of the projected image which is not to be illuminated in a given color, the substantially polarized color-component light beam of that color is reflected with the polarization of the beam nominally unchanged by the reflective liquid-crystal polarization modulator at the location on the polarization-modulator face corresponding to the location of the pixel in the projected image. Such non-illuminated pixels are referred to as "dark" pixels. The ratio of the intensity of a maximally illuminated light pixel to the intensity of a minimally illuminated dark pixel defines a contrast ratio, which is a significant figure of merit for digital-image projectors. Generally, the higher the light-to-dark contrast ratio for a projector, the more clearly an image produced by the projector may be discerned by a viewer.

The color-component light beam thus spatially selectively polarization modulated by a liquid-crystal polarization modulator of the digital-image projector of the '789 patent is reflected from the reflective polarization-modulator face of the polarization modulator substantially back along the corresponding component-beam optical path through the color splitting/combining prism assembly. Each of the three reflected color component light beams substantially retraces its original path through the prism assembly and recombines with the other two color component light beams to form one composite spatially selectively polarization-modulated light beam. The composite light beam emerges from the color splitting/combining prism assembly and passes into the polarizing beamsplitter cube. The polarizing beamsplitter cube splits the composite light beam into a nominally polarization-modulated light-pixel component beam which carries the composite color image made up of light pixels and a nominally non-polarization-modulated dark-pixel component beam which carries a color-negative image made up of dark pixels. Since the polarization of the dark-pixel component beam was nominally unchanged by the reflective liquid-crystal modulators, the dark-pixel component beam at least ideally retraces an optical path through the projector back towards the arc lamp which was the source of illumination. The polarization-modulated light-pixel component beam is directed from the polarizing beamsplitter into a projection lens of the digital-image projector of the '789 patent, which serves to project the desired composite color image onto a projection screen.

A difficulty with conventional digital-image projectors that are based on reflective polarization modulators arises because a conventional MacNeille-type multilayer dielectric film polarizing beamsplitter of the type heretofore typically used in such projectors generally treats two light rays impinging upon the polarizing beamsplitter differently with respect to polarization properties if the directions of incidence of the two rays differ with respect to the polarizing beamsplitter. Light beams which impinge upon the polarizing beamsplitter of a conventional digital-image projector are typically made up of light rays which have angles of incidence with respect to the beamsplitter which range over several degrees, since, in order to obtain sufficient illumination intensity for an adequately bright projected image from economically feasible light sources, conventional digital-image projectors typically employ illumination beams having a numerical aperture on the order of 0.1 or greater. See A. E. Rosenbluth et al., *IBM Journal of Research and Development*, volume 42, pages 359–386

(May/July 1998). A conical light beam with a numerical aperture of 0.1 passing through air subtends an angle of about ±6°. As discussed below in connection with FIGS. 1 through 3, light rays impinging upon a conventional MacNeille-type multilayer dielectric film polarizing beamsplitter in directions which differ from the direction of a principal axis defined with respect to the beamsplitter and the associated reflective polarization modulators give rise to leakage of light onto dark-pixel areas of the projected image. Consequently, variation in the directions of light rays around the pupil of the illumination beam in a conventional digital image projector employing beams of numerical aperture of 0.1 or so generally leads to an overall reduction in the light-to-dark contrast ratio relative to the light-to-dark contrast ratio which would be expected for a hypothetical projector which could somehow employ perfectly collimated beams made up of parallel rays which would all strike the polarizing beamsplitter at the same, optimum angle of incidence corresponding to the direction of the principal axis.

Turning now to FIG. 1, a conventional MacNeille-type multilayer dielectric film polarizing beamsplitter 2 is formed of a first beamsplitter prism 4, a second beamsplitter prism 6, and a multilayer dielectric polarizing film 8 located between the hypotenuse faces of the first and second prisms 4 and 6. The first and second beamsplitter prisms 4 and 6 are made of an optical glass. The layers of dielectric material making up the multilayer dielectric polarizing film 8 are not shown in FIG. 1. The thicknesses and indices of refraction of the layers making up the multilayer polarizing film 8 and the index of refraction of the optical glass of the beamsplitter prisms 4 and 6 are selected so that a ray 10 of unpolarized light incident upon the multilayer film 8 at an optimum polarizing angle θ passes into the multilayer material and strikes successive interfaces between layers of different indices of refraction at the so-called "Brewster's angle."

A ray of unpolarized light propagating through a first material which impinges upon an interface with a second material of different index of refraction at the Brewster's angle is partially reflected from the interface and partially refracted into the second material. The reflected ray is essentially totally linearly polarized, with its electric field ("E-field") oriented perpendicular to a plane of incidence defined by the direction of propagation of the ray impinging upon the interface and the normal to the interface. The refracted ray is only partially polarized, with the component the E-field in the plane of incidence stronger than the component of the E-field perpendicular to the plane of incidence. A discussion of polarization by reflection at the Brewster's angle may be found in the book *Optics* by Eugene Hecht, Third Edition, pages 342 through 346 (Addison Wesley 1998).

In a conventional MacNeille-type multilayer dielectric film polarizing beamsplitter 2, multiple interfaces are provided in the multilayer dielectric polarizing film to successively reflect polarized components of light from a light ray passing through the successive interfaces at the Brewster's angle. The thicknesses of the layers in the multilayer film are chosen so that the components of polarized light reflected from the various interfaces tend to add constructively. As a consequence, the refracted ray passing through successive interfaces becomes successively more and more polarized, with the E-field lying in the plane of incidence. Typically, a sufficient number of layers is chosen so that, as a practical matter, the ray 12 passing completely through the multilayer dielectric polarizing film 8 is effectively completely linearly polarized with the E-field lying in the plane of incidence.

The reflected ray 14 is also effectively completely linearly polarized with, as noted above, the E-field perpendicular to the plane of incidence. The construction of conventional MacNeille-type polarizing beamsplitters based on multilayer dielectric films is described in U.S. Pat. No. 2,403,731 to MacNeille and U.S. Pat. No. 5,453,859 to Sannohe and Miyatake.

Turning again to FIG. 1, the direction of propagation of a light ray propagating within the first beamsplitter prism 4 which impinges upon the multilayer dielectric polarizing film 8 in a conventional MacNeille-type multilayer dielectric film polarizing beamsplitter 2 for which the ray is optimally split into a linearly polarized reflected ray and a linearly polarized refracted ray is determined only by the angle between the direction of propagation and a normal 18 to the surface of the multilayer dielectric film at the hypotenuse face of the beamsplitter prism 4. The optimum polarizing angle θ and the normal 18 define an optimum-polarizing-angle cone 20 with respect to the multilayer film 8. Any ray of light incident upon the multilayer dielectric film 8 of the polarizing beamsplitter 2 which is directed along the surface of the optimum-polarizing-angle cone 20 will satisfy the optimum polarizing conditions of the film and be split into reflected and refracted component rays linearly polarized respectively perpendicular to and parallel to the plane of incidence defined with respect to that particular ray and the normal 18. Typically, the materials of which a conventional MacNeille-type multilayer dielectric film polarizing beamsplitter is made are selected with indices of refraction such hat the optimum polarizing angle θ is close to 45°. An aspect of the geometry of the polarization of rays of light by the conventional MacNeille-type multilayer dielectric film polarizing beamsplitter 2 which can give rise to depolarization effects and a reduction in the light-to-dark contrast ratio in digital image projectors employing such a beamsplitter is discussed in the following paragraphs.

In general, light rays passing through optical devices may be taken to be electromagnetic plane waves. It is a property of electromagnetic plane waves that the electric field components of an electromagnetic plane wave are directed perpendicular to the direction of propagation of the ray. In FIGS. 1 through 6 discussed below, double-headed arrows shown projecting perpendicular to the direction of propagation of a ray of light indicate symbolically the direction of the E-field of the light. A rosette of eight double-headed arrows projecting from a ray of light indicates that the light ray is unpolarized or only partially polarized. A single double-headed arrow or a pair of orthogonal double-headed arrows projecting from a ray of light indicates that the light ray is effectively linearly polarized.

Referring again to FIG. 1, a principal-axis ray 10 of unpolarized light extends along the optimum-polarizing-angle cone 20 and is split into a principal-axis reflected ray 14 and a principal-axis refracted ray 12, polarized respectively perpendicular and parallel to a principal-axis plane of incidence 15 defined with respect to the direction of propagation of the principal-axis ray 10 and the normal 18. The principal-axis ray 10 enters the first prism 4 of the polarizing beamsplitter 2 at a direction normal to an unpolarized-ray entrance face 22 of the prism. The principal-axis reflected ray 14 exits the polarizing beamsplitter through a reflected-ray exit face 24 in a direction normal to the face. A representative off-principal-axis incident ray 30 of unpolarized light is shown entering the unpolarized ray entrance face 22 of the first prism 4 of the polarizing beamsplitter 2. The off-principal-axis incident ray 30 is refracted at a point of entry 31 by the optical glass of the prism. The refracted unpolarized off-principal-axis ray 30 propagates along the surface of the optimum-polarizing-angle cone 20 at a position rotated about the cone relative to the principal-axis ray 10. Since the off-principal-axis unpolarized ray 30 also makes the optimum polarizing angle θ with the normal 18 to the multilayer dielectric polarizing film 8 at the hypotenuse face of the prism, the off-principal-axis unpolarized ray 30 is split into a linearly polarized off-principal-axis reflected ray 32 and a linearly polarized off-principal-axis refracted ray 34. The off-principal-axis reflected ray 32 and the off-principal-axis incident ray 30 both propagate in a skew-oriented plane of incidence 33 which is defined by the direction of propagation of the unpolarized off-principal axis incident ray 30 within the first prism 4 and the normal 18. The skew-oriented plane of incidence 33 is rotated about the normal 18 relative to the principal-axis plane of incidence 15. The E-field of the linearly polarized off-principal-axis reflected ray 32 is oriented perpendicular to the skew-oriented plane of incidence 33. The E-field of the linearly polarized off-principal-axis refracted ray 34 lies in the skew-oriented plane of incidence 33. Because the principal-axis plane of incidence 15 and the skew-oriented plane of incidence 33 are rotated relative to one another about the normal 18, the directions of the E-fields of the principal-axis reflected beam 14 and the off-principal-axis reflected beam 32 are not parallel to one another. Similarly, the E-fields of the principal-axis refracted beam 12 and the off-principal-axis refracted beam 34, which lie respectively in the principal-axis and the skew-oriented planes of incidence, are not parallel to one another.

Turning now to FIG. 2, a source of leakage of light onto dark pixel locations in a projected image from a conventional digital-image projector employing reflective polarization modulators and a conventional MacNeille-type multilayer dielectric film polarizing beamsplitter is illustrated. A reflective liquid-crystal polarization modulator 40 is positioned in front of the reflected-beam exit face 24 of the conventional MacNeille-type multilayer dielectric film polarizing beamsplitter 2 with the polarizing modulator face 42 of the modulator 40 extending parallel to the reflected-beam exit face 24 of the beamsplitter 2. A projection-lens input port 44 of a projection lens 46 of a digital-image projector is positioned facing a projected image exit face (not shown) of the second beamsplitter prism 6. In the drawing of FIG. 2, the polarization modulator 40 is illustrated operating in a pure reflection mode; that is to say, a ray of linearly polarized light impinging upon the polarization-modulator face 42 of the polarization modulator 40 at normal incidence is passively reflected at the polarization-modulator face with the polarization state of the ray essentially unchanged upon reflection. Pixel areas on the polarization-modulator face 42 of the reflective liquid-crystal polarization modulator 40 which reflect light nominally without change in polarization correspond to dark pixels in the projected image and ideally such reflected light should not pass into a projection-lens input port 44 of the projection lens 46 of the digital image projector.

A principal-axis incident ray 10 of unpolarized light passes into the unpolarized light entrance face 22 of the first prism 4 of the polarizing beamsplitter 2 substantially normal to the face 22. The direction of propagation of the unpolarized ray 10 corresponds to a segment of the principal optic axis of the polarizing beamsplitter 2 and polarizing modulator 40 and defines a Y coordinate axis in FIG. 2. As noted above, arrows normal to the direction of propagation of a ray of light indicate symbolically the direction of polarization of the E-field of the light. In FIG. 2—and subsequent FIGS. discussed below—solid arrowheads indicate the E-field direction before reflection from the polarization-modulator face 42 of the polarization modulator 40. After reflection at the polarization-modulator face 42, the arrowheads are shown with open heads to distinguish light incident upon the polarization-modulator face 42 of the polarization modulator 40 from light reflected from the polarization-modulator face 42. The principal-axis incident ray 10 is incident upon the multilayer dielectric polarizing film 8 at the hypotenuse face of the first prism 4 of the polarizing beamsplitter 2 at the optimum polarizing angle θ relative to a principal-axis normal 19 to the hypotenuse face at a point of incidence which defines a principal-axis intersection position 21 of the Y and Z principal axes. As a result, the principal-axis incident ray 10 is split by the multilayer dielectric polarizing film 8 into an effectively completely linearly polarized beamsplitter-reflected principal-axis ray 14 which propagates along a Z coordinate axis towards the reflective polarization modulator 40. The E-field of the linearly polarized beamsplitter-reflected principal-axis ray 14 is perpendicular to a principal plane of incidence 45 defined by the principal-axis incident ray 10 and the principal-axis normal 19. The principal plane of incidence 45 coincides with the Y-Z coordinate plane. The refracted component (not shown) of the principal-axis incident ray 10 passes in the Y direction out the bottom of the polarizing beamsplitter 2 and is discarded in a digital-image projector. The linearly polarized beamsplitter-reflected principal-axis ray 14 impinges upon the polarization-modulator face 42 of the polarization modulator 40 at normal incidence at a principal-axis intersection point 43 and is reflected with the polarization of the ray essentially unchanged. The modulator-reflected principal-axis ray 14 then retraces the path of the incident ray back into the polarizing beamsplitter 2. The modulator-reflected principal-axis ray 14 is incident upon the multilayer dielectric polarizing film 8 with the same angle of incidence as the unpolarized principal-axis incident ray 10. Specifically, the angle of incidence of the modulator-reflected principal-axis ray 14 relative to the principal-axis normal 19 to the multilayer dielectric polarizing film 8 is the optimum polarizing angle θ. Since the modulator-reflected principal-axis ray 14 is effectively completely linearly polarized with the E-field normal to the plane of incidence defined by the ray 14 and the principal-axis normal 19 to the multilayer dielectric polarizing film 8—specifically, the principal plane of incidence 45, the Y-Z plane—the modulator-reflected ray 14 is essentially totally reflected by the polarizing film 8 back along the path of the unpolarized principal-axis incident ray 10 and effectively does not reach the input port 44 of the projection lens 46 of the digital-image projector.

Consider now a representative principal-plane off-angle incident ray 50 of unpolarized light which propagates in the principal plane of incidence 45, the Y-Z coordinate plane, and is incident upon the multilayer dielectric polarizing film 8 of the polarizing beamsplitter 2 at a (Y,Z)-direction offset position 51 which is offset from the principal-axis intersection position 21 of the Y and Z principal axes. The principal-plane off-angle incident ray 50 makes an angle of incidence relative to a (Y,Z)-direction offset normal 52 of the hypotenuse face of the first prism 4 which is close to, but less than the optimum polarizing angle θ. Although U.S. Pat. Nos. 2,403,731 and 5,453,859 disclose that conventional MacNeille-type multilayer dielectric film beamsplitters can provide a significant polarizing effect for light rays making angles of incidence which differ from the optimum angle within a limited range, it is nonetheless the case that rays of unpolarized light which intercept the multilayer dielectric polarizing films of such conventional MacNeille-type multilayer dielectric film polarizing beamsplitters at angles other than the optimum polarizing angle are incompletely polarized to a degree. Thus, the beamsplitter-reflected off-angle ray 54 of light reflected from the multilayer dielectric polarizing film 8 is only partially polarized, with principal components of an E-field perpendicular to the Y-Z plane of incidence and small components lying within the Y-Z plane.

As may be seen in FIG. 2, the particular direction of incidence of the principal off-angle incident ray 50 and the particular (Y,Z)-direction offset position 51 at which the incident ray 50 strikes the hypotenuse face of the first prism 4 of the beamsplitter 2 result in the linearly polarized beamsplitter-reflected off-angle ray's 54 striking the polarization-modulator face 42 at the principal-axis intersection point 43. Since the beamsplitter-reflected off-angle ray 54 is an electromagnetic plane wave, the E-field components of the partially polarized ray 54 are directed perpendicular to the direction of propagation of the ray. Since the normal to the polarization-modulator face 42 of the polarization modulator 40 is the −Z direction and since the beamsplitter-reflected off-angle ray 54 propagates in the Y-Z plane, a plane of incidence 55 defined by the beamsplitter-reflected off-angle ray 54 and the normal to the polarization-modulator face 42 coincides with the Y-Z plane, the principal plane of incidence 45. The E-field components of the partially polarized beamsplitter-reflected off-angle ray 54 which are directed perpendicular to the Y-Z plane remain perpendicular to the Y-Z plane upon reflection of the ray by the polarization-modulator face 42 of the polarization modulator 40 and consequently are perpendicular to the direction of propagation of the off-angle ray 56 reflected from the polarization modulator face 42, since the modulator-reflected off-angle ray 56 propagates in the Y-Z plane. The components of the E-field of the partially polarized beamsplitter-reflected off-angle ray 54 which are directed within the Y-Z plane are tipped upon reflection of the ray by the polarization-modulator face 42 so that the components are directed perpendicular to the direction of propagation of the modulator-reflected off-angle ray 56.

The modulator-reflected off-angle ray 56 propagates back into the polarizing beamsplitter 2 and intercepts the multilayer dielectric polarizing film 8 at the hypotenuse face of the first prism 4 at a (−Y,−Z)-direction offset position 57 offset from the principal axis intersection position 21 in a direction opposite to the (Y,Z)-direction offset position 51. The modulator-reflected off-angle ray 56 makes an angle of incidence with a (−Y,−Z)-direction offset normal 59 to the polarizing film 8 which is greater than the optimum polarizing angle θ for the multilayer film 8. Since the partially polarized modulator-reflected off-angle ray 56 includes E-field components in the Y-Z plane of incidence and since the angle of incidence of the ray differs from the optimum polarizing angle θ for the film 8, the ray is only partially reflected at the multilayer dielectric polarizing film 8 out of the entrance face 22 of the first prism 4 of the beamsplitter 2. A fraction of the modulator-reflected off-angle ray 56 is refracted through the polarizing film 8 of the polarizing beamsplitter and exits the polarizing beamsplitter 2 towards the input 44 of the projection lens 46 to constitute a dark-pixel leakage ray 60. Since any light ray which is reflected by the polarization modulator 40 at a location on the polarization-modulator face 42 which is not driven to rotate actively the polarization of the ray is intended to be diverted from the projection lens 46 of the digital-image projector in order to achieve a dark pixel at the corresponding pixel location in the projected image, the dark-pixel leakage ray 60 undesirably serves to reduce the light-to-dark contrast ratio of the projector.

Turning now to FIG. 3, another source of leakage of light onto dark-pixel locations in a projected image from a conventional digital-image projector which employs reflective polarization modulators and a conventional MacNeille-type multilayer dielectric film polarizing beamsplitter is illustrated. A polarizing beamsplitter 2, a polarization modulator 40, and a projection lens 46 are arranged as discussed above in connection with FIG. 2. Y and Z coordinate axes defined with respect to the beamsplitter 2 specify corresponding principal optic axes 61 and 62 of the beamsplitter 2 and the modulator 40. An X coordinate axis extends in the plane of the hypotenuse face of the first prism 4 of the beamsplitter 2. A principal-axis normal 19 is defined to project perpendicular to the hypotenuse surface of the first prism 4 at the position 21 of intersection of the principal optic axes corresponding to the Y and Z coordinate axes. A (−X,Y,Z)-quadrant offset normal 66 projects perpendicularly from the hypotenuse face of the first prism 4 at a (−X,Y,Z)-quadrant offset position 65 displaced in a −X, +Y, +Z direction from the principal-axis intersection position 21 of the Y and Z principal axes 61 and 62.

Consider a representative on-angle, off-axis incident ray 64 of unpolarized light which enters the polarizing beamsplitter 2 through the unpolarized-light entrance face 22 20 of the first prism 4 of the beamsplitter 2 and propagates along a direction which is close to, but differs from the direction of the Y principal axis 61. The on-angle, off-axis incident ray 64 propagates in an offset, skew-oriented plane of incidence 70 which is offset from the principal-axis intersection position 21 of the Y and Z principal axes 61 and 62 to include the (−X,Y,Z)-quadrant offset normal 66. The offset, skew-oriented plane of incidence 70 is rotated about the offset normal 66 relative to an offset reference plane (not shown) oriented parallel to the Y-Z plane. The on-angle, off-axis incident ray 64 intercepts the multilayer dielectric polarizing film 8 at the hypotenuse face of the first prism 4 at the (−X,Y,Z)-quadrant offset position 65. The on-angle, off-axis incident ray 64 makes an angle of incidence equal to the optimum polarizing angle θ for the multilayer dielectric polarizing film 8 in the beamsplitter 2 with the (−X,Y,Z)-quadrant offset normal 66. Consequently, the on-angle, off-axis incident ray 64 is split into an essentially completely linearly polarized beamsplitter-reflected off-axis ray 68 and an essentially completely linearly polarized beamsplitter-refracted off-axis ray (not shown) which continues propagating through the beamsplitter 2 in the direction of propagation of the incident ray 64. The E-field of the linearly polarized beamsplitter-reflected ray 68 is directed perpendicular to the offset, skew-oriented plane of incidence 70.

As may be seen in FIG. 3, the particular direction of incidence of the on-angle, off-axis incident ray 64 and the particular (−X,+Y,+Z)-quadrant offset position 65 at which the incident ray 64 strikes the hypotenuse face of the first prism 4 of the beamsplitter 2 result in the linearly polarized beamsplitter-reflected off-axis ray's 68 striking the polarization-modulator face 42 of the reflective polarization modulator 40 at a point of intersection 43 of the Z principal axis 62 with the modulator face 42. The Z principal axis 62 intersects the modulator face 42 at normal incidence and thus serves as a normal to the modulator face 42. The beamsplitter-reflected off-axis ray 68 makes a nonzero angle of incidence with the normal defined by the Z principal axis 62 and consequently is reflected passively from the modulator face 42 as a modulator-reflected off-axis ray 154 propagating in a modulator-reflection plane of incidence 73 defined by the direction of propagation of the incident beamsplitter-reflected off-axis ray 68 and the Z principal axis 62. Because of the offset relative to the principal-axis intersection position 21 of the (−X,Y,Z)-quadrant offset position 65 at which the beamsplitter-reflected off-axis ray 68 is reflected from the multilayer film 8 of the beamsplitter 2, the modulator-reflection plane of incidence 73 is in general neither parallel to, nor perpendicular to the offset, skew-oriented plane of incidence 70. Consequently, the E-field of the linearly polarized beamsplitter-reflected off-axis ray 68—which is perpendicular to the offset, skew-oriented plane of incidence 70—in general has both a component in the plane of the modulator-reflection plane of incidence 73 and a component perpendicular to the modulator-reflection plane of incidence 73. Upon passive reflection at the polarization modulator face 42, the component of the E-field of the beamsplitter-reflected off-axis ray 68 which is perpendicular to the modulator-reflection plane of incidence 73 remains perpendicular to that plane. The component of the E-field of the beamsplitter-reflected off-axis ray 68 which lies within the modulator-reflection plane of incidence 73 is tipped upon passive reflection of the ray by the 30 modulator face 42 so that the E-field component is directed perpendicular to the direction of propagation of the modulator-reflected off-axis ray 71. Consequently, in general, the E-field of the linearly polarized modulator-reflected off-axis ray 71 is not parallel to the E-field of the linearly polarized beamsplitter-reflected off-axis ray 68. Since the extent to which a ray of linearly polarized light is reflected or transmitted by the polarizing beamsplitter 2 depends in general on the orientation of the E-field of the ray as well as on the direction of propagation of the ray, the change in orientation of the E-field of the linearly polarized beamsplitter-reflected ray 68 caused by non-normal-incidence passive reflection at the modulator face 42 can in general be a factor in the transmission of light through the beamsplitter 2 to a dark-pixel location in the projected image and thus lead to a reduction in the light-to-dark contrast ratio.

The modulator-reflected off-axis ray 71 enters the first prism 4 of the polarizing beamsplitter 2 and intercepts the multilayer dielectric polarizing film 8 at the hypotenuse face of the first prism 4 at an (X,−Y,−Z)-quadrant position 75 offset in an (X,−Y,−Z)-quadrant direction from the principal-axis intersection position 21 of the Y and Z principal axes 61 and 62. The (X,−Y,−Z)-quadrant direction is generally at least approximately opposite to the (−X,Y,Z)-quadrant direction in cases in which the unpolarized on-angle off-axis ray 64 is close to the principal axis 61. The angle of incidence which the modulator-reflected off-axis ray 71 makes with an (X,−Y,−Z)-quadrant offset normal 72 to the polarizing film 8 at the (X,−Y,−Z)-quadrant position 75 is greater than the optimum polarizing angle θ for the multilayer dielectric polarizing film 8 in the beamsplitter 2. An offset, counter-skew-oriented plane of incidence 74 is defined by the direction of propagation of the modulator-reflected off-axis ray 71 and the (X,−Y,−Z)-quadrant offset normal 72. The offset, counter-skew-oriented plane of incidence 74 is rotated about the (X,−Y,−Z)-quadrant offset normal 72 relative to an offset reference plane (not shown) which is oriented parallel to the Y-Z plane and includes the offset normal 72 in a rotational sense counter to the rotation of the offset, skew-oriented plane of incidence 70 about the (−X,Y,Z)-quadrant offset normal 66. The offset, counter-skew-oriented plane of incidence 74 and the offset, skew-oriented plane of incidence 70 are therefore not parallel to one another. In part because of the counter rotation of the offset, counter-skew-oriented plane of incidence 74 relative to the offset, skew-oriented plane of incidence 70 and in part because of the change in orientation of the E-field of the linearly polarized modulator-reflected off-axis ray 71 relative to the orientation of the E-field of the beamsplitter-reflected off-axis ray 68 upon reflection at the polarization modulator face 42 of the polarization modulator 40, the E-field of the modulator-reflected off-axis ray 71 is not in general perpendicular to the counter-skew-oriented plane of incidence 74. Rather, the E-field of the modulator-reflected ray 71 can in general be resolved vectorially into a component which lies within the offset, counter-skew-oriented plane of incidence 74 as well as a component which is perpendicular to the plane of incidence 74. In part because the offset, counter-skew-oriented plane of incidence 74 can include a component of the E-field of the linearly polarized modulator-reflected off-axis ray 71 and in part because the angle of incidence between the modulator-reflected off-axis ray 71 and the (X,−Y,−Z)-quadrant offset normal 72 does not equal the optimum polarizing angle θ for the polarizing beamsplitter 2, the modulator-reflected off-axis ray 71 is only partially reflected by the multilayer dielectric polarizing layer 8 out of the polarizing beamsplitter 2. A leakage ray 76 is refracted through the multilayer dielectric polarizing film 8 and exits the polarizing beamsplitter propagating towards the input port 44 of the projection lens 46 of the digital-image projector. The leakage ray 76 serves to illuminate partially a dark pixel area of the projected image and thus serves to reduce undesirably the light-to-dark contrast ratio of the digital-image projector.

Because the direction of light rays making up an unpolarized illuminating beam in a conventional digital image projector changes around the aperture (pupil) of the beam, an illuminating beam in such a projector falling upon a conventional MacNeille-type multilayer dielectric film polarizing beamsplitter of the type discussed above in connection with FIGS. 1 through 3 includes off-angle and off-axis incident rays—including incident rays which are both off-angle and off-axis—as well as incident rays propagating along the principal-axis direction of the beamsplitter. As a consequence of the dependency of the polarizing properties of such a beamsplitter on the direction of an incident ray and the ray discrimination properties of such a beamsplitter on both the polarization state of an incident ray and the direction of incidence of the ray, conventional digital image projectors have had difficulties in reducing to a sufficient degree the amount of light leaking to dark-pixel locations in a projected image.

Attempts have been made in prior-art digital-image projectors employing reflective polarization modulators and conventional MacNeille-type multilayer dielectric film polarizing beamsplitters to reduce the intensity of leakage light rays which would illuminate dark-pixel locations in a projected image. However, as discussed below, such attempts have not been completely successful and entail additional drawbacks.

U.S. Pat. No. 5,777,789 discussed above, for example, discloses placing a polarizing film in the illumination path between a lamp of the digital-image projector of the patent and the polarizing beamsplitter cube and placing a polarizing film between the polarizing beamsplitter cube and the projection lens for polarization control and contrast enhancement. However, use of such polarizing films entails additional expense in manufacturing a digital-image projector and additional loss of illumination intensity in the operation of the digital-image projector. Moreover, such polarizing films would not eliminate entirely the problem of leakage from off-angle rays and on-angle, off-axis rays discussed in the preceding paragraphs in connection with FIGS. 2 and 3.

European published patent application No. 0 389 240 discloses a digital-image projection system in which a quarter-wave foil is placed at a certain orientation in a beam path between the polarizing beamsplitter and each liquid-crystal polarization modulator of the projector. An on-angle, off-axis light ray of the sort illustrated FIG. 3 propagating in a direction close to, but not coincident with a principal axis direction of a MacNeille-type beamsplitter, after linear polarization upon reflection by the beamsplitter, passing once through such a quarter-wave foil propagating from the polarization beamsplitter to the reflective polarization modulator and a second time through such a quarter-wave foil on the return from the polarization modulator to the beamsplitter has the E-field rotated from a direction normal to the plane of incidence defined by the original unpolarized ray and the normal of the hypotenuse face of the polarizing beamsplitter to a direction more nearly normal to the plane of incidence defined by the modulator-reflected ray and a corresponding normal. The resulting modulator-reflected ray tends to be more nearly completely reflected by the polarizing beamsplitter out of the beamsplitter away from the input port for the projection lens.

Although use of such quarter-wave foils can enhance the light-to-dark contrast ratio of digital-image projectors to a degree, the correction is never perfect. Moreover, there are a number of practical disadvantages to such use of quarter-wave foils. First, quarter-wave foils constitute additional components which must be included in the system and represent an increase in manufacturing and parts costs. The foils must be mounted on the polarizing beamsplitter, in an air space between the beamsplitter and the reflective polarization modulator, or on the reflective polarization modulator panel. Mounting the foil is difficult, since orientation of the foil must be precise. Any clocking of the foil significantly reduces contrast. Lamination of the foil to a support can bring difficulties, such as cosmetic problems of dust and other flaws in the lamination that appear as bright spots in a dark field. If the foil is laminated to the polarizing beamsplitter or polarization modulator face, any errors can result in manufacturing yield loss or additional cost in rework. The quarter-wave foil is made from a birefringent material that has two indices of refraction, ordinary and extraordinary. It is impossible to match both indices simultaneously, which would be required to eliminate Fresnel reflections. Fresnel reflections from the foil can therefore not be fully eliminated and could limit contrast in future very high contrast systems. Finally, the quarter-wave foil must act as a quarter-wave retarder over the entire wavelength region of interest, which is difficult to achieve. Typically any dispersion in the foil is similar in both the ordinary and extraordinary indices of the foil so that the net retardance does not change dramatically with wavelength. As a consequence, the phase delay as a fraction of the wavelength tends to vary linearly with wavelength. The result is that contrast is optimized at some central wavelength and falls off to either side of the spectrum.

An additional problem can arise in a digital-image projector which employs a conventional MacNeille-type polarizing beamsplitter which has a multilayer dielectric polarizing film positioned on a hypotenuse face between two prisms. As even small amounts of light are absorbed in the prisms or in the polarizing film, the bulk of the glass of the prisms of the beamsplitter can experience stress. The glass of the prisms of the beamsplitter can also experience stress if an external stress is applied to the beamsplitter. Stress in the glass of the prisms can create birefringence in the glass that can change the polarization state of light propagating in the glass. Such stress-induced polarization change can result in unacceptable light leakage in the dark state. One solution to the stress induced birefringence problem is to use an optical glass in the prisms which has a small stress optical coefficient. However, such glass tends to be expensive. Another possible solution to the stress induced birefringence problem is to use a liquid-immersed polarizing beamsplitter. In a liquid-immersed polarizing beamsplitter, a multilayer dielectric polarizing film coating is applied to a plate that is then immersed in a liquid filled tank. In general, a multilayer dielectric film can function as a polarizing beamsplitter only when the dielectric film is surrounded on both sides by a medium with a high index of refraction. A multilayer dielectric film based plate-beamsplitter is not possible in air. Although a liquid-immersed polarizing beamsplitter can be made with a high-index-of-refraction liquid medium, such beamsplitters tend to have practical difficulties with respect to maintaining the purity of the liquid and avoiding temperature gradients within the liquid.

It has been proposed in published International PCT patent application WO 01/09677 and application WO 00/70386 that certain problems with conventional digital image projectors employing reflective polarization modulators and conventional MacNeille-type polarizing beamsplitters which employ multilayer dielectric polarizing film can be avoided by substituting a wire-grid polarizing beamsplitter for the multilayer dielectric film polarizing beamsplitter. The '677 published PCT application discloses an image projection system using a wire-grid polarizing beamsplitter. FIG. 4 of the present application illustrates the use of a wire-grid polarizing beamsplitter in a configuration shown schematically in FIGS. 1A and 7 of the '677 published PCT application. FIG. 4 has been drawn to facilitate comparison of the functioning of a wire-grid beamsplitter with the conventional MacNeille-type multilayer dielectric film polarizing beamsplitter illustrated in FIG. 2 of the present application.

Turning now to FIG. 4, a wire-grid polarizing beamsplitter 100 is made up of a plurality of electric conductors 102 extending generally parallel to and spaced apart from one another on a grid-support face 112 of a transparent grid support plate 104. The direction of linear extent of the conductors 102 making up the wire grid 106 defines an X-coordinate direction. Collectively, the substantially parallel conductors 102 define a wire grid 106. The spacing of the wires of the grid is generally less than the wavelength of the shortest wavelength of the visible light used in a projector, roughly 290 nm. The wire-grid support plate 104 is transparent to light over the visible range.

As shown in FIG. 4, a principal axis ray 110 of unpolarized light impinges upon a wire grid 106 of a wire-grid polarizing beamsplitter 100 along a direction which defines a Y coordinate axis. The angle of incidence of the principal-axis ray 110 relative to a normal 114 perpendicular to the grid-support face 112 is essentially 45°. The wire-grid polarizing beamsplitter 100 splits the incident principal-axis ray 110 into a beamsplitter-reflected principal-axis ray 116 which is directed along a Z coordinate axis and a beamsplitter transmitted principal-axis ray 118 which passes through the wire grid 106 and the grid-support plate 104 of the beamsplitter 100 and departs along the Y axis. The beamsplitter-reflected principal-axis ray 116 is essentially completely linearly polarized with an E-field direction which extends parallel to the direction of the wires 102 making up the wire grid 106, the X-coordinate direction. The beamsplitter reflected principal-axis ray 116 propagates to the polarization-modulator face 42 of the reflective liquid-crystal polarization modulator 40 and intersects the modulator face 42 at the principal axis intersection point 43 at normal incidence. In the case illustrated in FIG. 4, the polarization modulator face 42 passively reflects the beamsplitter-reflected principal-axis ray 116 at the principal axis intersection point 43 without altering the polarization state of the ray, so that the modulator-reflected principal-axis ray constitutes a dark-pixel ray.

The modulator-reflected principal-axis ray 116 proceeds back to the wire-grid polarizing beamsplitter 100 where it impinges on the wire grid 106 at an angle of incidence of essentially 45°. Since the modulator-reflected principal-axis ray 116 is linearly polarized with the E-field parallel to the direction of linear extent of the wires 102 of the wire grid 106, the modulator-reflected principal-axis ray 116 is reflected by the wire-grid polarizing beamsplitter back along the Y direction and is diverted away from the input port 44 of the projection lens 46 of the digital-image projector. Had the liquid-crystal polarization modulator 40 rotated the polarization of the modulator-reflected principal-axis ray, the rotated component of the ray would have passed through the wire-grid polarizing beamsplitter along the minus Z coordinate direction and entered the input port 44 of the projection lens 46 to illuminate a light pixel area of the projected image.

A representative principal-plane off-axis incident ray 120 of unpolarized light passes within a principal plane of incidence 121, the Y-Z plane, to impinge upon the wire grid 106 of the wire-grid polarizing beamsplitter 100 at a (Y,Z)-direction offset position 123 which is offset from the principal axis intersection position 111 of the Y and Z principal axes. The principal-plane off-axis incident ray 120 makes an angle of incidence relative to a (Y,Z)-direction offset normal 122 to the wire grid 106 of less than 45°. The principal-plane off-axis incident ray 120 is split by the wire-grid polarizing beamsplitter 100 into a beamsplitter reflected ray 124 and a beamsplitter transmitted ray (not shown) which passes through the wire-grid polarizing beamsplitter 100 and continues along in the direction of the propagation of the off-axis ray 120. Although the angle of incidence of the off-axis ray 120 differs from the angle of incidence of the principal-axis ray 110, the beamsplitter-reflected off-axis ray 124 is essentially completely linearly polarized with an E-field which is directed parallel to the direction of the linear extent wires 102 making up the wire grid 106 of the polarizing beamsplitter 100, which is the X-coordinate direction perpendicular to the Y-Z plane of incidence 121.

The beamsplitter reflected off-axis ray 124 proceeds within the Y-Z plane of incidence 121 to the polarization-modulator face 42 of the reflective polarization modulator 40. The angle of incidence of the principal-plane off-axis incident ray 120 and the offset distance to the (Y,Z)-direction offset position 123 result in the beamsplitter-reflected off-axis ray's 124 striking the polarization modulator face 42 at the principal axis intersection point 43. Since the normal to the polarization-modulator face 42 of the polarization modulator 40 is the −Z direction and since the beamsplitter-reflected off-axis ray 124 propagates in the Y-Z plane, a plane of incidence 55 defined by the beamsplitter-reflected off-axis ray 124 and the normal to the polarization-modulator face 42 coincides with the Y-Z plane, the principal plane of incidence 45. The E-field of the linearly polarized beamsplitter-reflected off-axis ray 124 which is directed in the X-coordinate direction perpendicular to the Y-Z plane remains perpendicular to the Y-Z plane upon passive reflection of the ray by the polarization-modulator face 42 of the polarization modulator 40 and consequently is perpendicular to the direction of propagation of the off-angle ray 126 reflected from the polarization modulator face 42, since the modulator-reflected off-axis ray 126 also propagates in the Y-Z plane.

The modulator-reflected off-axis ray 126 impinges upon the wire grid 106 of the wire-grid polarizing beamsplitter 100 at an angle of incidence greater then 45°. Since the modulator-reflected off-axis ray 126 is linearly polarized with the E-field directed parallel to the direction of the linear extent of the wires 102 making up the wire grid 106 of the wire-grid polarizing beamsplitter 100, the ray is essentially totally reflected at the wire grid 106 and diverted from entering the input port 44 of the projection lens 46 of the digital-image projector, in contrast to the corresponding modulator-reflected off-angle ray 56 which impinges upon the multilayer dielectric polarizing film 8 of the conventional MacNeille-type polarizing beamsplitter 2 illustrated in FIG. 2.

Turning next to FIG. 5, an off-principal axis ray 150 of unpolarized light impinges upon a wire grid 106 mounted on a grid-support face 112 of a grid-support plate 104 of a wire-grid polarizing beamsplitter 100 along a direction which is close to, but differs from a principal axis 61 of the polarizing beamsplitter 100 and a polarization modulator 40—the Y coordinate axis. For purposes of comparison, the direction of the off-axis incident ray 150 is the same as the direction of incidence of the on-angle, off-axis incident ray 64 propagating in the first prism 4 of the conventional MacNeille-type polarizing beamsplitter 2 illustrated in FIG. 3. The off-axis incident ray 150 propagates in an offset, skew-oriented plane of incidence 70 which is offset from the principal-axis intersection position 21 of the Y and Z principal axes 61 and 62 to include the (−X,Y,Z)-quadrant offset normal 66. The offset, skew-oriented plane of incidence 70 is rotated about the offset normal 66 relative to an offset reference plane (not shown) oriented parallel to the Y-Z plane. The off-axis incident ray 150 intercepts the wire grid 106 on the grid-support face 112 of the grid-support plate 104 of the wire-grid polarizing beamsplitter 100 at a (−X, Y,Z)-quadrant offset position 65. The off-axis incident ray 150 makes an angle of incidence of essentially 45° with the (−X,Y,Z)-quadrant offset normal 66. The off-axis incident ray 150 is split by the wire grid 106 into an essentially completely linearly polarized beamsplitter-reflected off-axis ray 152 and an essentially completely linearly polarized beamsplitter-transmitted off-axis ray (not shown) which passes through the wire grid 106 and the grid-support plate 104 and continues propagating in the direction of propagation of the incident ray 150. The directions of the respective E-fields of the beamsplitter-transmitted off-axis ray and the beamsplitter-reflected off-axis ray 152 are discussed in the following paragraph.

For purposes of understanding the polarizing effects of the wire grid 106 on the unpolarized off-axis incident ray 150, it is helpful to consider the off-axis incident ray 150 to be a linear combination with random coefficients of two linearly polarized reference incident rays with orthogonal E-fields propagating along the same path as the off-axis incident ray 150.

The first of the two linearly polarized reference incident rays is defined to have an E-field directed along a line of intersection between a plane perpendicular to the direction of propagation of the ray and the Y-Z plane defined with respect to the wire-grid polarizing beamsplitter 100.

Consequently, the E-field of the first reference incident ray is directed perpendicular both to the direction of propagation of the ray—required for a plane wave—and to the X-coordinate axis, which is the direction of the extent of the wires 102 making up the wire grid 106 of the beamsplitter 100. As a result of the orientation of the E-field of the first linearly polarized reference incident ray, when incident on the wire grid 106 of the polarizing beamsplitter 100, the first reference incident ray would effectively "see" only a transparent plate and, ignoring reflections at the interfaces between the faces of the plate and air, would be transmitted through the beamsplitter 100. The orientation of the E-field of the first linearly polarized reference incident ray corresponds to the orientation of the E-field of the linearly polarized beamsplitter-transmitted off-axis ray split from the unpolarized off-axis incident ray 150 by the wire-grid polarizing beamsplitter 100.

The direction of the E-field of the second linearly polarized reference incident ray is defined to extend perpendicular to the direction of propagation of the incident ray and perpendicular to the line of intersection between the plane perpendicular to the direction of propagation of the ray and the Y-Z plane. The E-field of the second linearly polarized reference incident ray is therefore directed perpendicular to the E-field of the first linearly polarized reference incident ray. As a result of the orientation of the E-field of the second linearly polarized reference incident ray, the second reference incident ray would effectively "see" a mirror surface at the wire grid 106 when incident upon the beamsplitter 100 and would be reflected as at a mirror. The plane of incidence of such an effective mirror reflection of the second linearly polarized reference incident ray would be the offset, skew-oriented plane of incidence 70. The E-field of the reflected second reference ray can be determined by vectorially resolving the E-field of the second linearly polarized reference incident ray into a component perpendicular to the offset, skew-oriented plane of incidence 70 and a component lying within the offset, skew-oriented plane of incidence 70. Upon effective mirror reflection at the wire grid 106 of the wire-grid polarizing beamsplitter, the component of the E-field perpendicular to the offset, skew-oriented plane of incidence 70 would remain oriented in a direction perpendicular to the plane of incidence 70. The component of the E-field lying within the offset, skew-oriented plane of incidence 70 would remain in the plane of incidence 70 upon reflection, but would be tipped upon reflection to be oriented perpendicular to the direction of propagation of the reflected ray. The orientation of the E-field of the thus reflected second linearly polarized reference incident ray corresponds to the orientation of the E-field of the linearly polarized beamsplitter-reflected off-axis ray 152 split from the unpolarized off-axis incident ray 150 by the wire-grid polarizing beamsplitter 100. In particular, the E-field of the linearly polarized beamsplitter-reflected off-axis ray 152 would in general include a component perpendicular to the offset, skew-oriented plane of incidence 70 and a component lying within the offset, skew-oriented plane of incidence 70, in contrast to the linearly polarized beamsplitter reflected ray 68 from the conventional MacNeille-type polarizing beamsplitter 2 discussed above in connection with FIG. 3. Although the beamsplitter-reflected off-axis ray 152 from the wire-grid polarizing beamsplitter 100 of FIG. 5 and the beamsplitter reflected ray 68 from the conventional MacNeille-type polarizing beamsplitter 2 of FIG. 3 are both linearly polarized, the E-fields of the two beamsplitter reflected rays would not in general be oriented in the same direction.

As in the case of the on-angle, off-axis incident ray 64 of FIG. 3, the particular direction of incidence of the unpolarized off-axis incident ray 150 of FIG. 5 and the particular (−X,+Y,+Z)-quadrant offset position 65 at which the incident ray 150 strikes the wire grid 106 of the polarizing beamsplitter 100 result in the linearly polarized beamsplitter-reflected off-axis ray's 152 striking the polarization-modulator face 42 of the reflective polarization modulator 40 at a point of intersection 43 of the Z principal axis 62 with the modulator face 42. The beamsplitter-reflected off-axis ray 152 makes a nonzero angle of incidence with the normal defined by the Z principal axis 62 and consequently is reflected passively from the modulator face 42 as a modulator-reflected off-axis ray 154 propagating in a modulator-reflection plane of incidence 73 defined by the direction of propagation of the incident beamsplitter-reflected off-axis ray 152 and the Z principal axis 62. Because of the offset relative to the principal-axis intersection position 21 of the (−X,Y,Z)-quadrant offset position 65 at which the beamsplitter-reflected off-axis ray 152 is reflected from the wire grid 106 of the beamsplitter 100, the modulator-reflection plane of incidence 73 is in general neither parallel to, nor perpendicular to the offset, skew-oriented plane of incidence 70. Consequently, the E-field of the linearly polarized beamsplitter-reflected off-axis ray 152—which in general includes a component perpendicular to the offset, skew-oriented plane of incidence 70 and a component within the plane of incidence 70—would in general be expected to have both a component in the plane of the modulator-reflection plane of incidence 73 and a component perpendicular to the modulator-reflection plane of incidence 73. Upon passive reflection at the polarization modulator face 42, the component of the E-field of the beamsplitter-reflected off-axis ray 152 which is perpendicular to the modulator-reflection plane of incidence 73 remains perpendicular to that plane. The component of the E-field of the beamsplitter-reflected off-axis ray 152 which lies within the modulator-reflection plane of incidence 73 is tipped upon passive reflection of the ray by the modulator face 42 so that the E-field component is directed perpendicular to the direction of propagation of the modulator-reflected off-axis ray 154. Consequently, in general, the E-field of the linearly polarized modulator-reflected off-axis ray 154 would not be expected to be parallel to the E-field of the linearly polarized beamsplitter-reflected off-axis ray 152. Since the extent to which a ray of linearly polarized light is reflected or transmitted by the wire grid polarizing beamsplitter 100 depends in general on the orientation of the E-field of the ray, the change in orientation of the E-field of the linearly polarized beamsplitter-reflected ray 152 caused by non-normal-incidence passive reflection at the modulator face 42 could in general be a factor in the transmission of light through the wire grid 106 of the beamsplitter 100 to a dark-pixel location in the projected image and thus could lead to a reduction in the light-to-dark contrast ratio.

The modulator-reflected off-axis ray 154 propagates to the wire-grid polarizing beamsplitter 100 and intercepts the wire grid 106 at an (X,−Y,−Z)-quadrant position 75 offset in an (X,−Y,−Z)-quadrant direction from the principal-axis intersection position 21 of the Y and Z principal axes 61 and 62. The extent to which the linearly polarized modulator-reflected off-axis ray 154 is reflected by the wire grid 106 of the polarizing beamsplitter 100 and thereby diverted from an input port 44 of a projection lens 46 of the digital-image projector located in the direction of incidence of the modulator-reflected off-axis ray 154 on the opposite side of the beamsplitter 100 depends upon the direction of the E-field of the modulator-reflected off-axis ray 154 relative to the direction of the extent of the wires 102 making up the wire grid 106 of the beamsplitter 100 and not upon the direction or angle of incidence of the off-axis ray 154 relative to the wire-grid beamsplitter 100, as in the case of a conventional MacNeille-type polarizing beamsplitter. The E-field of the modulator-reflected off-axis ray 154 may in general include a component along a line of intersection between a plane perpendicular to the direction of propagation of the ray 154 and the Y-Z plane defined with respect to the wire-grid polarizing beamsplitter 100, as a result, for example, of reflection in the modulator-reflection plane of incidence 73 at the modulator face 42 of the polarization modulator 40. Such a component of the E-field of the linearly polarized modulator-reflected off-axis ray 154 would lead to transmission of a leakage ray 156 through the wire grid 106 of the polarizing beamsplitter 100 propagating towards the input port 44 of the projection lens 46 of the digital-image projector. Such a leakage ray 156 would tend to illuminate partially a dark pixel area of the projected image and thus serve to reduce undesirably the light-to-dark contrast ratio of the digital-image projector. However, as a practical matter, dark-state leakage from modulator reflected off-axis rays from around the pupil of an illumination beam in the case of high-performance wire-grid polarizing beamsplitters is significantly less of a problem than in the case of conventional MacNeille-type multilayer dielectric film beamsplitters.

Wire-grid-polarizer polarizing beamsplitters in configurations heretofore disclosed for digital image projection systems can have drawbacks, particularly for high-resolution image projection systems. A wire-grid polarizer on the grid-support face of the polarizing beamsplitter should be optically flat, since the wire-grid polarizer must act on image-bearing light beams without distorting the image. In order to maintain a grid-support surface of a wire-grid-polarizer polarizing beamsplitter sufficiently flat, the grid-support plate of the beamsplitter must be thick. However, a thick plate of optical glass can suffer from stress birefringence, either from thermal effects or externally applied stress. In configurations heretofore disclosed for digital image projection systems such as illustrated in FIGS. 4 and 5 above, beams bearing images to be projected have been required to pass through the grid-support plate of the wire-grid-polarizer polarizing beamsplitter and consequently such beams have been at risk for image distortion caused by stress birefringence in the grid-support plate. In addition, the thick grid-support plate of a wire-grid polarizer when tilted as required for use as a polarizing beamsplitter can introduce astigmatism, and to a lesser extent coma, into a beam passing at the tilted angle through the grid-support plate, giving rise to risk of further distortion of images born by a beam passing through a tilted grid support plate in digital-image projection-system configurations heretofore disclosed.

SUMMARY OF THE INVENTION

We have invented a digital-image projector which can project color images of high quality and exhibits an excellent light-to-dark contrast ratio and avoids problems of the prior art noted above.

The digital-image projector of the invention includes an illumination-light source lamp for generating white-spectrum illumination light and illumination-beam forming optics for receiving illumination light generated by the source lamp and forming from such light a white-spectrum illumination beam.

The digital-image projector of the invention also includes color-band-separation optics for dividing the input white-spectrum illumination beam into three spatially separated color-component illumination subbeams.

The digital-image projector of the invention further includes a reflective digital-image-encoding polarization modulator mechanism for spatially modulating the polarization of incident linearly polarized color-component illumination subbeams upon reflection of the subbeams in accordance with corresponding color-component images of a desired color digital image to form reflected color-component image-encoded-polarization subbeams.

The digital-image projector of the invention includes additionally projection lens optics for projecting color-image bearing light rays for viewing the desired color image.

Finally, the digital-image projector of the invention includes a plate-supported, surface-mounted fixed-polarization-axis polarizing beamsplitter for directing in a polarization-state selective fashion illumination light rays incident upon the beamsplitter into dark-pixel-polarization-state polarized light rays for forming linearly polarized color-component illumination subbeams incident upon the reflective digital-image-encoding polarization modulator mechanism. Additionally, the fixed-polarization-axis polarizing beamsplitter can function to divide image-encoded-polarization light rays incident upon the beamsplitter drawn from reflected color-component image-encoded-polarization subbeams from the reflective digital-image-encoding polarization modulator mechanism into dark-pixel-polarization-state polarized negative-image bearing light rays and light-pixel-polarization-state polarized color-image bearing light rays for forming the desired color image. The polarizing beamsplitter comprises a transparent polarizer-support plate and a fixed-polarization-axis polarizer mounted on a substantially optically flat outer face of the polarizer-support plate which defines a polarizer-support face. The fixed-polarization axis polarizer is thin in a dimension perpendicular to the polarizer-support face.

Defined with respect to the polarizing beamsplitter of the digital-image projector of the invention are an illumination-beam-reception axis, a dark-pixel-polarization-state polarized beam axis, and a light-pixel-polarization-state polarized beam axis. In operation, the illumination light rays incident upon the beamsplitter propagate in a direction substantially parallel to the illumination-beam-reception axis, the image-encoded-polarization light rays incident upon the beamsplitter propagate in a direction substantially parallel to the dark-pixel-polarization-state polarized beam axis, and the light-pixel-polarization-state polarized color-image bearing light rays divided from the image-encoded-polarization light rays by the beamsplitter propagate in a direction substantially parallel to the light-pixel-polarization-state polarized beam axis. A polarizer-support-face normal is defined to project outwardly from the polarizer-support face of the polarizer-support plate in a direction perpendicular to the polarizer-support face.

The fixed-polarization-axis polarizing beamsplitter of the digital-image projector of the invention is positioned and oriented with the dark-pixel-polarization-state polarized beam axis extending outwardly from the fixed-polarization-axis polarizer mounted on the polarizer-support face of the polarizer-support plate. A polarized-beam-axis angle is defined as an angle between the dark-pixel-polarization-state polarized beam axis and the polarizer-support-face normal. The polarized-beam-axis angle is substantially greater than zero degrees—most preferably, 45°. The illumination-beam-reception axis extends in a direction effectively parallel to the direction of the dark-pixel-polarization-state polarized beam axis outwardly from a face of the polarizer-support plate opposing the polarizer-support face. The light-pixel-polarization-state polarized beam axis extends outwardly from the polarizer-support face of the polarizer-support plate in a plane of incidence defined by the dark-pixel-polarization-state polarized beam axis and the polarizer-support-face normal and makes an angle of reflection with the polarizer-support-face normal equal to the polarized-beam-axis angle. The fixed-polarization-axis polarizing beamsplitter is oriented to receive the illumination light rays propagating towards the polarizing beamsplitter substantially parallel to the illumination-beam reception axis and through the transparent polarizer-support plate to the fixed-polarization-axis polarizer mounted on the polarizer-support face of the polarizer-support plate, to direct the dark-pixel-polarization-state light rays to propagate outwardly from the polarizer-support face substantially parallel to the dark-pixel-polarization-state polarized beam axis, to receive the image-encoded-polarization light rays propagating towards the beamsplitter substantially parallel to the dark-pixel-polarization-state polarized beam axis directly upon the fixed-polarization-axis polarizer mounted on the polarizer-support face of the polarizer-support plate without passing through the polarizer-support plate, and to divide the image-encoded-polarization light rays into the dark-pixel-polarization-state polarized negative-image bearing light rays propagating through the transparent polarizer-support plate and away from the polarizing beamsplitter substantially parallel to the illumination-beam-reception axis and the light-pixel-polarization-state polarized color-image bearing light rays propagating away from the polarizer-support face substantially parallel to the light-pixel-polarization-state polarized beam axis without passing through the polarizer-support plate for projection by the projection lens optics.

In a first preferred embodiment of the digital-image projector of the invention, the digital-image projector includes an illumination-light source lamp for generating white-spectrum illumination light and illumination-beam forming optics positioned to receive illumination light generated by the source lamp and adapted to form from such light a white-spectrum illumination beam.

The first preferred embodiment of the digital image projector further includes a color-band-separation subbeam-position-sweeper assembly which has a white-spectrum illumination beam input optical port and a color-component swept-position separated-triple-subbeam output optical port. The color-band-separation subbeam-position-sweeper assembly is adapted to accept an input white-spectrum illumination beam into he white-spectrum illumination beam input optical port and divide the input white-spectrum illumination beam into three spatially separated color-component subbeams. The color-band-separation subbeam-position-sweeper assembly is further adapted to sweep the position of each of the color-component subbeams repetitively between first and second limit positions while maintaining the subbeams in a nonoverlapping relationship to form three spatially separated color-component swept-position subbeams and to project the three spatially separated color-component swept-position subbeams from the color-component swept-position separated-triple-subbeam output optical port.

The first preferred embodiment of the digital image projector also includes a reflective three-moving-image-area digital-image-encoding polarization modulator which includes an essentially planar array of reflective-polarization-modulation pixel areas defining a modulator face of the polarization modulator and an image-encoding signal input port for receiving image-encoding signals for selectively setting the polarizing-activity states of selectively addressed pixel areas. Each reflective-polarization-modulation pixel area is adapted to modulate selectively the polarization of linearly polarized light falling on the pixel area in accordance with the polarizing-activity state of the pixel area. The modulator face of the polarization modulator is adapted to have defined thereon in operation three essentially nonoverlapping color-component swept-position image areas, each of which image areas corresponds to a color-component illumination area illuminated by an associated color-component swept-position subbeam projected in operation at substantially normal incidence onto the modulator face. Each one of the color-component swept-position image areas in operation is defined to sweep repetitively across the modulator face simultaneously with the sweeping of the other two color-component swept-position image areas in accordance with the sweeping of the associated color-component swept-position subbeams. The polarization modulator is adapted to receive three-moving-image-area color-component image-encoding signals at the image-encoding signal port and, for each of the three color-component swept-position image areas, selectively set the polarizing-activity states of reflective-polarization-modulation pixel areas associated with the color-component swept-position image area on the fly as the image area sweeps across the modulator face to polarizing activity states which encode over the moving image area a corresponding color-component moving image-area portion of a desired full-color, full-size image. The corresponding linearly polarized color-component swept-position subbeam projected onto and swept across the modulator face to illuminate the color-component swept-position image area of the modulator face at substantially normal incidence is thereby reflected from the moving image area at substantially normal incidence with the polarization spatially modulated at any instant to encode the corresponding color-component image-area portion of the desired image at that instant, so that over a sweep-cycle repetition time to sweep across the modulator face the color-component swept-position subbeam is reflected from the modulator face with the polarization continuously modulated to encode in a swept-image fashion the corresponding color component of the desired full-size image.

The first preferred embodiment of the digital image projector includes also projection lens optics for accepting three color-component swept-position image subbeams into a projection-lens input optical port and projecting the three color-component swept-position image subbeams from a projection-lens output optical port for viewing the image.

Finally, the first preferred embodiment of the digital image projector of the invention includes a plate-supported, surface-mounted fixed-polarization-axis thin-polarizer polarizing beamsplitter. The polarizing beamsplitter comprises a transparent polarizer-support plate and a fixed-polarization-axis polarizer mounted on a substantially optically flat outer face of the polarizer-support plate which defines a polarizer-support face. The fixed-polarization axis polarizer is thin in a dimension perpendicular to the polarizer-support face. The polarizing beamsplitter has defined with respect thereto an illumination-beam-reception axis, a dark-pixel-polarization-state polarized beam axis, and a light-pixel-polarization-state polarized beam axis. A polarizer-support-face normal is defined to project outwardly from the polarizer-support face of the polarizer-support plate in a direction perpendicular to the polarizer-support face. The dark-pixel-polarization-state polarized beam axis extends outwardly from the polarizer-support face of the polarizer-support plate, with a polarized-beam-axis angle being defined as an angle between the dark-pixel-polarization-state polarized beam axis and the polarizer-support-face normal. The polarized-beam-axis angle is substantially greater than zero degrees. The illumination-beam-reception axis extends in a direction effectively parallel to the direction of the dark-pixel-polarization-state polarized beam axis outwardly from a face of the polarizer-support plate opposing the polarizer-support face. The light-pixel-polarization-state polarized beam axis extends outwardly from the polarizer-support face of the polarizer-support plate and makes an angle with the polarizer-support-face normal equal to the polarized-beam-axis angle. The fixed-polarization-axis polarizing beamsplitter is adapted to receive three spatially separated color-component swept-position subbeams propagating towards the polarizing beamsplitter substantially parallel to the illumination-beam reception axis and through the transparent polarizer-support plate to the polarizer-support face and to divide from the three spatially separated color-component swept-position subbeams by means of the fixed-polarization-axis polarizer on the polarizer-support face three linearly polarized spatially separated color-component swept-position dark-pixel-polarization-state subbeams propagating outwardly from the polarizer-support face substantially parallel to the dark-pixel-polarization-state polarized beam axis. The fixed-polarization-axis polarizing beamsplitter is further adapted to receive three spatially separated color-component swept-position composite image subbeams propagating towards the beamsplitter substantially parallel to the dark-pixel-polarization-state polarized beam axis directly upon the fixed-polarization-axis polarizer mounted on the polarizer-support face of the polarizer-support plate without passing through the polarizer-support plate. Each color-component swept-position composite image subbeam contains dark-pixel-polarization-state linearly polarized light bearing a color-component negative image and light-pixel-polarization-state linearly polarized light bearing a desired color-component image. The fixed-polarization-axis polarizing beamsplitter is additionally adapted to divide each color-component swept-position composite image subbeam into a color-component swept-position dark-pixel-polarization-state linearly polarized beam bearing the color-component negative image propagating through the transparent polarizer-support plate and away from the polarizing beamsplitter substantially parallel to the illumination-beam-reception axis and a color-component swept-position light-pixel-polarization-state linearly polarized beam bearing the desired color image propagating outwardly from the polarizer-support face substantially parallel to the light-pixel-polarization-state polarized beam axis without passing through the polarizer-support plate. The illumination-beam reception axis of the polarizing beamsplitter is effectively aligned with a swept-position-subbeam central axis of the color-band-separation subbeam-position-sweeper assembly. The dark-pixel-polarization-state polarized beam axis of the polarizing beamsplitter is effectively aligned with a normal to the modulator face of the polarization modulator and the light-pixel-polarization-state polarizing beam axis of the polarizing beamsplitter is effectively aligned with a projection-lens-input-port axis of the projection lens optics.

In a second preferred embodiment of the digital-image projector of the invention, the digital-image projector includes an illumination-light source lamp for generating white-spectrum illumination light and beam forming optics positioned to receive illumination light generated by the source lamp and adapted to form a white-spectrum illumination beam from such light.

The second preferred embodiment of the digital-image projector further includes a beam color dividing/combining prism assembly which has a composite beam input/output optical port and three primary color output/input optical ports. The beam color dividing/combining prism assembly is adapted to accept a white-spectrum input beam into the composite beam input/output optical port, divide the white-spectrum input beam into three component primary-color output beams, and project each of the component primary-color output beams respectively from the corresponding primary-color output/input optical port. The beam color dividing/combining prism assembly is further adapted to accept respectively input beams of each of the three primary colors into the corresponding one of the three primary color output/input optical ports, combine the three primary-color input beams into a composite output beam, and project the composite output beam from the composite beam input/output optical port of the prism assembly.

The second preferred embodiment of the digital-image projector also includes three reflective digital-image-encoding polarization modulators. Each of the reflective polarization modulators is positioned facing a corresponding one of the three primary color output/input optical ports of the beam color dividing/combining prism assembly. Each reflective polarization modulator is adapted to reflect and spatially modulate the polarization of a polarized component primary-color output beam projected from the corresponding primary-color output/input optical port onto the modulator in accordance with a corresponding primary-color component of a desired digital image to form a reflected image-encoded-polarization primary-color input beam directed into the corresponding primary color output/input optical port.

The second preferred embodiment of the digital-image projector includes additionally projection lens optics for accepting an image beam into a projection-lens input optical port and projecting the image beam from a projection-lens output optical port for viewing the image.

Finally, the second preferred embodiment of the digital-image projector of the invention includes a plate-supported, surface-mounted fixed-polarization-axis thin-polarizer polarizing beam splitter. Such polarizing beamsplitter comprises a transparent polarizer-support plate and a fixed-polarization-axis polarizer mounted on an essentially optically flat outer face of the polarizer-support plate which defines a polarizer-support face. The fixed-polarization axis polarizer is thin in a dimension perpendicular to the polarizer-support face. Three axes are defined with respect to the polarizing beamsplitter: an illumination-beam-reception axis, a dark-pixel-polarization-state polarized beam axis, and a light-pixel-polarization-state polarized beam axis. A polarizer-support-face normal is defined to project outwardly from the polarizer-support face in a direction perpendicular to the polarizer-support face. The dark-pixel-polarization-state polarized beam axis extends outwardly from the polarizer-support face of the polarizer-support plate and makes a polarized-beam-axis angle substantially greater than zero degrees with the polarizer-support-face normal. The illumination-beam-reception axis extends in a direction effectively parallel to the direction of the dark-pixel-polarization-state polarized beam axis outwardly from a face of the polarizer-support plate opposing the polarizer-support face. The light-pixel-polarization-state polarized beam axis extends outwardly from the polarizer-support face and makes an angle of reflection with the polarizer-support-face normal equal to the polarized-beam-axis angle. The polarizing beamsplitter is adapted to receive an illumination beam propagating towards the polarizing beamsplitter substantially along the illumination-beam reception axis and through the transparent polarizer-support plate to the fixed-polarization-axis polarizer mounted on the polarizer-support face of the polarizer-support plate, to divide from the illumination beam by means of the fixed-polarization-axis polarizer on the polarizer-support face a linearly polarized dark-pixel-polarization-state beam propagating outwardly from the polarization-support face substantially along the dark-pixel-polarization-state polarized beam axis, to receive a composite image beam containing dark-pixel-polarization-state linearly polarized light bearing a color-negative image and light-pixel-polarization-state linearly polarized light bearing a desired color image propagating towards the beamsplitter substantially along the dark-pixel-polarization-state polarized beam axis directly upon the fixed-polarization-axis polarizer mounted on the polarizer-support face of the polarizer-support plate without passing through the polarizer-support plate, to divide the composite beam into a dark-pixel-polarization-state linearly polarized beam bearing the color-negative image propagating through the transparent polarizer-support plate and away from the polarizing beamsplitter substantially along the illumination-beam-reception axis and a light-pixel-polarization-state linearly polarized beam bearing the desired color image propagating outwardly from the polarizer-support face substantially along the light-pixel-polarization-state polarized beam axis without passing through the polarizer-support plate. The illumination-beam reception axis of the polarizing beamsplitter is effectively aligned with an illumination beam axis of the illumination-beam forming optics. The dark-pixel-polarization-state polarized beam axis of the polarizing beamsplitter is effectively aligned with a composite-beam input/output port axis of the beam color dividing/combining prism assembly. The light-pixel-polarization-state polarizing beam axis of the polarizing beamsplitter is effectively aligned with the projection-lens-input-port axis of the projection lens optics.

The plate-supported, surface-mounted fixed-polarization-axis thin-polarizer polarizing beamsplitter of the digital-image projector of the invention preferably has an acceptance angle for receiving the illumination beam corresponding to a numerical aperture in the range of from 0.1 to 0.25 or even greater. Correspondingly, the illumination-beam forming optics of the digital-image projector of the invention preferably has a numerical aperture in the range of from 0.1 to 0.25 or even greater. More preferably, the illumination-beam forming optics of the digital-image projector of the invention has a numerical aperture of at least 0.15 and the polarizing beamsplitter has an acceptance angle for receiving the illumination beam corresponding to a numerical aperture of at least 0.15. Most preferably, the illumination-beam forming optics of the digital-image projector of the invention has a numerical aperture of at least 0.2 and the polarizing beamsplitter has an acceptance angle for receiving the illumination beam corresponding to a numerical aperture of at least 0.2.

Preferably, the polarized-beam-axis angle between the normal to the polarizer-support-face of the polarizer-support plate of the polarizing beamsplitter and the dark-pixel-polarization-state polarized beam axis defined with respect to the polarizing beamsplitter in the digital-image projector of the invention is in the range of from about 20° to about 70°. Most preferably, the polarized-beam-axis angle in the digital-image projector is approximately 45°.

Preferably, the polarizer-support face of the polarizer-support plate of the fixed-polarization axis polarizing beamsplitter of the digital-image projector of the invention is flat to within five wavelengths of visible light per inch. Most preferably, the polarizer-support face of the polarizer-support is flat to within two wavelengths of visible light per inch.

Preferred the reflective digital-image-encoding polarization modulators for the digital-image projector of the invention include reflective liquid crystal displays (RLCD), which are also referred to as liquid crystal on silicon displays (LCoS).

Preferably, the plate-supported, surface-mounted fixed-polarization axis thin-polarizer polarizing beamsplitter is a wire-grid-polarizer polarizing beamsplitter. The wire-grid-polarizer polarizing beamsplitter comprises a transparent grid-support plate and a wire-grid polarizer made up of a plurality of substantially linear electrical conductors mounted on an outer grid-support face of the grid-support plate. The electrical conductors extend substantially parallel to one another and are spaced apart from one another, with the spacing between adjacent electrical conductors preferably being less than the wavelength of the shortest wavelength of the visible light used in a projector, roughly 290 nm. The grid support plate is preferably transparent to light over the visible range. The polarizing properties of wire grids are discussed in *Optics* by Eugene Hecht, $3^{rd}$ edition (Addison-Wesley, 1998), pages 327 through 328 and G. R. Bird and M. Parrish, Jr., *J. Opt. Soc. Am.,* volume 50, pages 886–891 (1960). Wire-grid polarizing beamsplitters generally suitable for certain preferred embodiments of the digital-image projector of the invention are commercially available from Moxtek, Inc. of Orem, Utah under the trade name "ProFlux Polarizers."

A ray of unpolarized light incident upon a wire-grid-polarizer polarizing beamsplitter is split into two linearly polarized rays, one of which is reflected from the surface of the wire grid and the other of which passes through the wire grid. The transmitted ray is linearly polarized with the E-field perpendicular to the direction of the wires making up the grid. Incident light with E-field components parallel to the direction of linear extent of the wires making up the grid is reflected to form the linearly polarized reflected ray. The axis of polarization is determined by the physical structure of the wire grid; specifically, the direction of extent of the wires of the grid. Thus, for example, the transmitted polarization vectors, when projected on a plane, do not rotate around the pupil of the beam as with a conventional MacNeille-type multilayer dielectric film beamsplitter.

An alternative preferred plate-supported, surface-mounted fixed-polarization-axis thin-polarizer polarizing beamsplitter for the digital-image projector of the invention is a plate-supported, surface-mounted alternating birefringent/nonbirefringent-film-polarizer polarizing beamsplitter. The plate-supported, surface-mounted alternating birefringent/nonbirefringent-film-polarizer polarizing beamsplitter comprises a transparent film-support plate and an alternating birefringent/nonbirefringent-film polarizer mounted on an outer film-support face of the film-support plate. The alternating birefringent/nonbirefringent-film polarizer includes alternating layers of oriented birefringent material and nonbirefringent material in which the index of refraction of the nonbirefringent material substantially equals one of the indices of refraction of the oriented birefringent material. Since the indices of refraction of the alternating layers of material are matched in one direction and not matched in the orthogonal direction, light of one polarization direction effectively "sees" a uniform index of refraction and is transmitted through the multilayer film, whereas light of the orthogonal polarization sees a stack of layers of alternating, differing indices of refraction and is reflected. Such an alternating birefringent/nonbirefringent-film polarizer is described in published international PCT patent application No. WO 00/70386. A multilayer stack of alternating birefringent/nonbirefringent-film could be disposed on an outer film-support face of a transparent film-support plate which could be oriented at, for example, 45° to the axis of an incident beam to form a polarizing beamsplitter. The polarization axes are determined by the orientation of the birefringent layers. Thus, like the wire-grid polarizing beamsplitter, such a polarizing beamsplitter tends to avoid the skew angle problem of conventional MacNeille-type multilayer dielectric film polarizing beamsplitters.

In the present invention, difficulties of a conventional MacNeille-type multilayer dielectric film polarizing beamsplitter a re a voided by using a fixed-polarization-axis beamsplitter based on diffractive or birefringent structures. With such a polarizing beamsplitter, the reflected and transmitted polarization states are not dependent on the direction of propagation of the light in the way of a conventional MacNeille-type polarizing beamsplitter. As a practical matter, skew angle depolarization is largely avoided and there is no need for a quarter-wave foil to improve contrast.

In the digital image projector of the invention, the polarizer-support plate of the polarizing beamsplitter faces an illumination-source side of the optical system of the projector and the polarizer-support face of the polarizing beamsplitter faces a reflective-polarization-modulator side of the optical system of the projector. Consequently, as shown in FIG. 6, the wire-grid polarizing beamsplitter 100 is oriented so that an illumination beam 170 from an illumination-source side of the optical system of the projector is incident upon a face 172 of a grid-support plate 104 of eh beamsplitter 100 which is opposite to the grid-support face 112 of the grid-support plate 104 on which the wire grid 106 is mounted. A reflective polarization modulator 40 is illuminated by a linearly polarized beam 174 drawn from the illumination beam 170 upon transmission of illumination beam 170 through the transparent grid-support plate 104 and the wire grid 106 of the polarizing beamsplitter 100. An image encoded-polarization beam 176 reflected from a modulator face 42 of the polarization modulator 40 is incident directly upon the wire grid 106 mounted on the grid-support plate 104 of the polarizing beamsplitter 100 without passing through the grid-support plate 104. The wire grid 106 divides the image-encoded-polarization beam 176 into a dark-pixel-polarization-state polarized negative-image bearing beam 180 which propagates through the grid-support plate 104 and away from the polarizing beamsplitter 100. and a light-pixel-polarization-state polarized color-image bearing light beam 178 which propagates away from the wire grid 106 without passing through the grid-support plate 104 and on to projection lens optics (not shown). The wire grid 106 at the polarizing beamsplitter interface is preferably optically flat since the wire grid is in the imaging path and acts upon image-encoded light beams. In order to maintain the wire grid 106 sufficiently flat the grid support plate has a substantial thickness. As noted above, a thick glass plate can suffer from stress birefringence. However, because of the orientation of the polarizing beamsplitter 100 with grid-support plate 104 of the polarizing beamsplitter 100 facing an illumination-source side of the optical system of the projector, such stress birefringence will essentially affect only the illumination beam 170 and result in a negligible loss in efficiency. When the reflective polarization modulator 40 is in the off state, there is no glass to disturb the polarization of the linearly polarized beams passing from the wire grid 106 of the polarizing beamsplitter 100 and returning to the wire-grid 106 after reflection from the polarization modulator 40.

As pointed out above, a relatively thick tilted grid-support plate of the wire-grid-polarizer polarizing beamsplitter can introduce astigmatism and to a lesser extent coma into a beam passing at the tilted angle through the grid-support plate. However, such aberrations for the beamsplitter orientation of FIG. 6 are in the illumination path. In the illumination path the impact of aberrations is less since there is no image information. Nonetheless, it is preferred to provide some compensation of astigmatism in the digital image projector of the invention. Such compensation may be provided by insertion of a cylindrical lens or other astigmatism compensation in the illumination path of the projector. Preferably such astigmatism compensation is located in the illumination path near the system pupil or incorporated into a relay lens otherwise near the system pupil or at an intermediate image of the pupil.

BRIEF DESCRIPTION OF THE DRAWINGS

Preferred embodiments of the invention will be described below with reference to the following figures:

FIGS. 8 and 9 are simplified schematic drawings of side and top views of a rotating prism assembly used in a variation of the optical arrangement used in the first preferred digital image projector of FIG. 7.

DETAILED DESCRIPTION OF PREFERRED EMBODIMENTS

Figure 1:
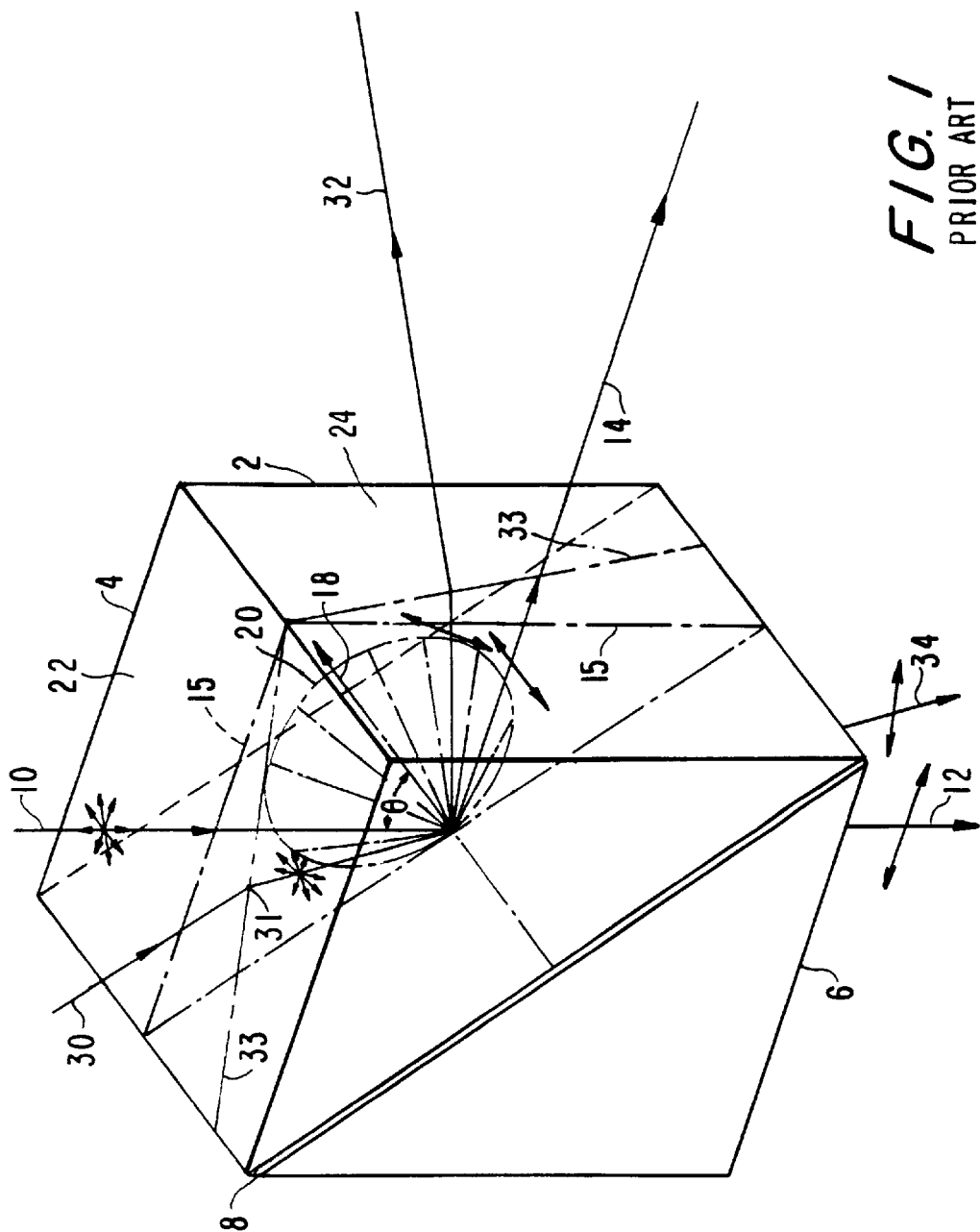
FIG. 1 is a drawing of a conventional MacNeille-type polarizing beamsplitter which employs a multilayer dielectric polarizing film illustrating propagation directions of unpolarized light rays for optimum polarization by the beamsplitter.
Figure 2:
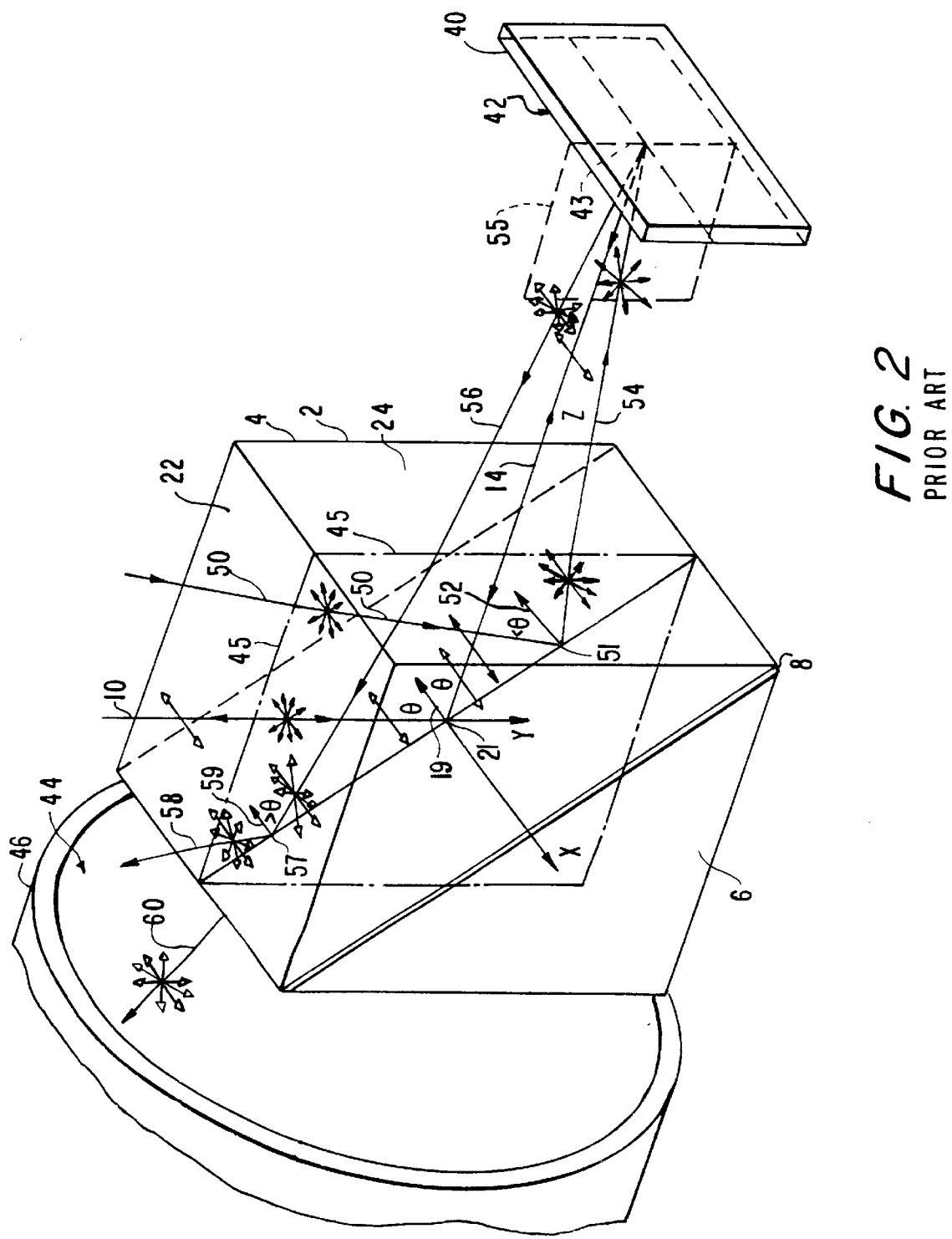
FIGS. 2 and 3 are simplified schematic drawings of the polarizing beamsplitter of FIG. 1 positioned between a reflective liquid-crystal polarization modulator and an input optical port of a projection lens of a conventional digital-image projector illustrating an undesirable leakage of light onto a dark pixel location. In the case of FIG. 2, such leakage of light results from incidence of an unpolarized ray of light onto a polarizing surface of the beamsplitter at an angle different from the optimum polarizing angle. In the case of FIG. 3, the undesired leakage of light onto a dark pixel location results from incidence of an unpolarized ray of light onto the polarizing surface of the beamsplitter at the optimum polarizing angle, but along a direction skewed with respect to a principal axis defined with respect to the polarization beamsplitter and a polarization-modulator face of the reflected polarization modulator.
Figure 3:
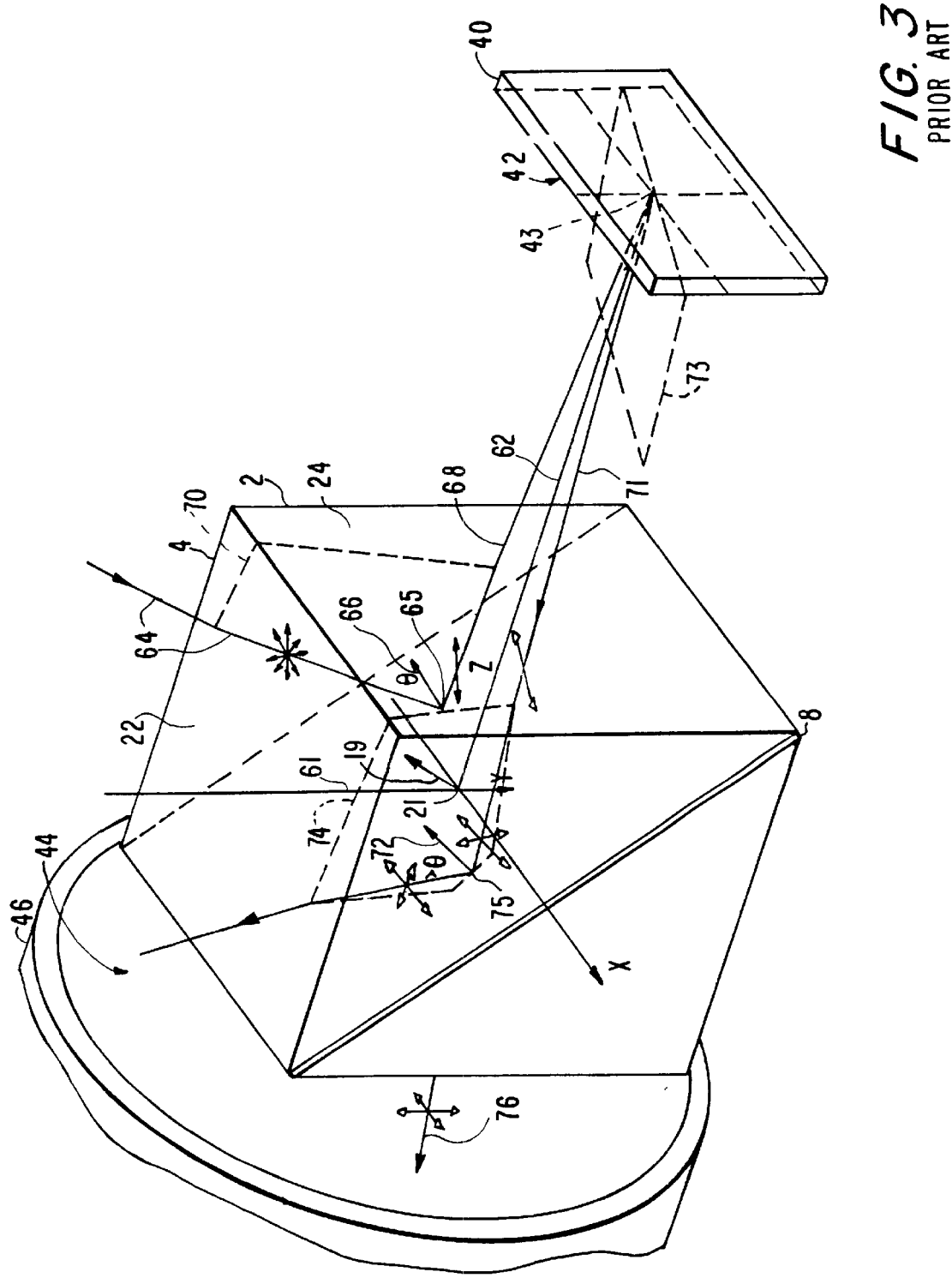
Figure 4:
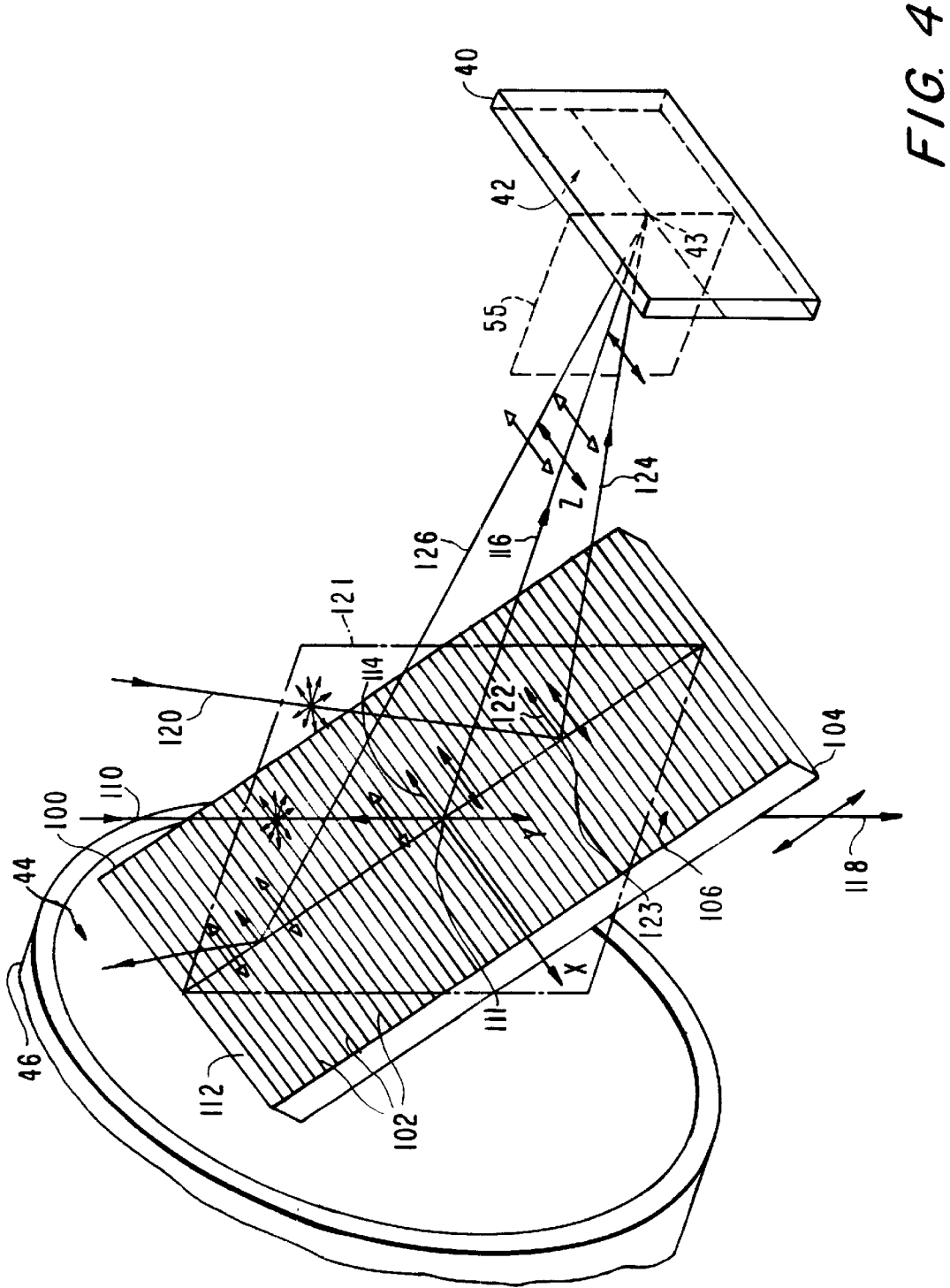
FIGS. 4 and 5 are simplified schematic drawings of a wire-grid polarizing beamsplitter positioned and oriented as disclosed in the prior art between a reflective liquid-crystal polarization modulator and an input optical port of a projection lens of a digital-image projector so that a light-pixel-polarization-state modulated beam bearing a desired image to be projected by the projection lens passes through a transparent grid-support plate of the polarizing beamsplitter at an angle tilted away from normal incidence.
Figure 5:
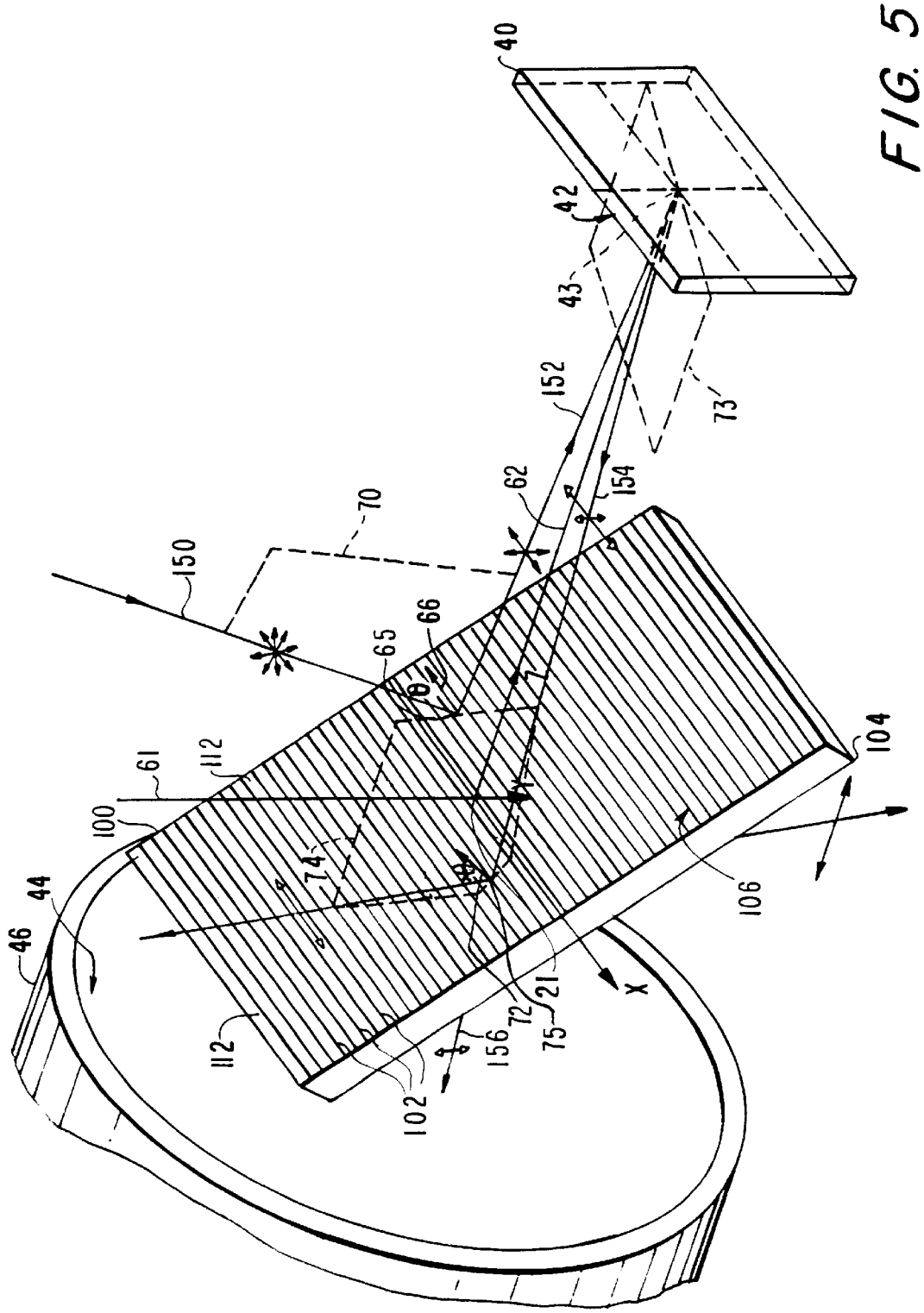
Figure 6:
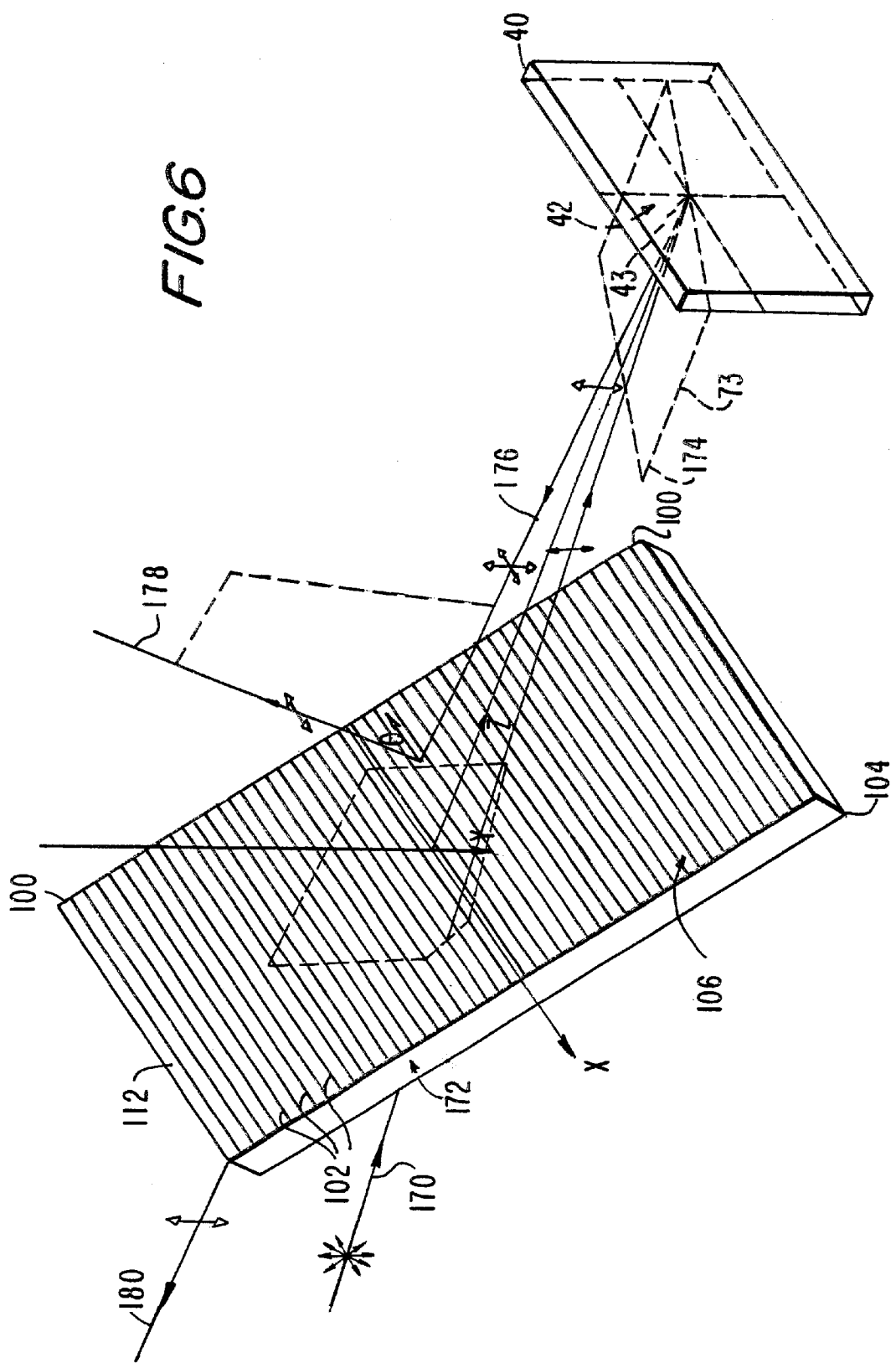
FIG. 6 is a simplified schematic drawing of a wire-grid polarizing beamsplitter positioned between a reflective liquid-crystal polarization modulator and an input optical port of a projection lens of a preferred digital-image projector of the invention in which a light-pixel-polarization-state modulated beam bearing a desired image to be projected by the projection lens is reflected from a grid-support face of the wire-grid polarizing beamsplitter and does not pass through a grid-support plate of the beamsplitter.
Figure 7:
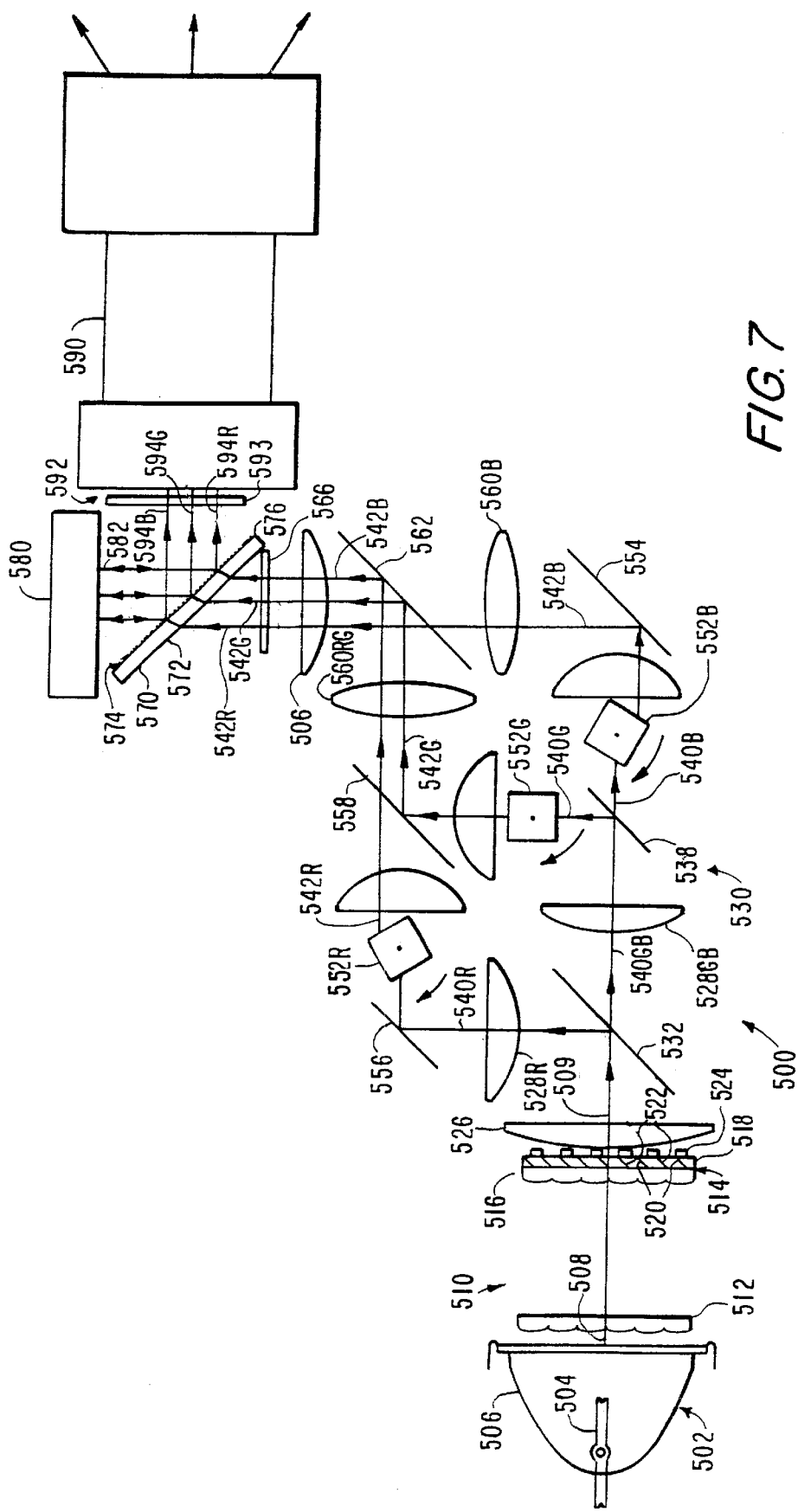
FIG. 7 is a simplified schematic optical diagram of a first preferred digital image projector of the invention.

Turning now FIG. 7, a first preferred digital-image projector 500 includes an illumination-beam source assembly 502, which includes a high-intensity lamp 504 located in a parabolic reflector 506. The illumination-beam source assembly 502 produces an illumination beam of unpolarized, white-spectrum light for the projector. For simplicity, in FIG. 7 beams of light are indicated only by the central rays of the various beams, such as the central ray 508 of the unpolarized illumination beam produced by the illumination-beam source assembly 502. Ultraviolet, infrared, and color-compensation filters (not shown) are placed in the path of the illumination beam to remove light of ultraviolet and infrared frequencies from the beam and impart a desired color spectral shape to the frequency spectrum of the beam.

A light-conserving beam-polarizer assembly 510 is located in the path of the unpolarized illumination beam 508 in the preferred digital-image projector 500. The beam-polarizer assembly 510 is of a type broadly similar to a beam polarizer described in U.S. Pat. No. 5,986,809 to Itoh and Hashizume, the disclosure of which is hereby incorporated by reference. Briefly, the beam-polarizer assembly 510 includes a first lens array 512 consisting of a rectangular array of substantially rectangular plano-convex lens elements. In operation, the first lens array 512 divides the illumination beam 508 into a rectangular array of focused subbeams. The beam polarizer 510 also includes a polarizing-beamsplitter/half-wave-plate assembly 514 positioned in the focal plane of the focused subbeams produced by the first lens array 512. The polarizing-beamsplitter/half-wave-plate assembly 514 includes a second lens array 516 and a plurality of pairs of alternating elongated polarizing-beamsplitter-film strips 520 and elongated reflective mirror strips 522. Both the polarizing beamsplitter film strips 520 and reflective mirror strips 522 extend linearly parallel to one another in a direction perpendicular to the central ray of the illumination beam 508 and are inclined at a substantially 45° angle with respect to the central ray of the beam 508. The second lens array 516 includes a rectangular array of substantially rectangular lens elements which correspond one-to-one to the lens elements of the first lens array 512 of beam polarizer assembly 510. Each lens element of the second lens array 514 further focuses an unpolarized subbeam from a corresponding lens element of the first lens array 512 onto a portion of a polarizing-beamsplitter-film strip 520 of the polarizing-beamsplitter/half-wave-plate assembly 514. The polarizing-beamsplitter-film strip 520 divides the unpolarized subbeam into two linearly polarized subbeans, a first of which passes through the polarizing-beamsplitter-film strip 520 and a second of which is reflected from the polarizing-beamsplitter-film strip 520 onto an adjacent reflective mirror strip 522. The first and second polarized subbeams have polarizations which are essentially orthogonal to one another. The reflective mirror strip 522 is oriented to reflect the second linearly polarized subbeam out of the polarizing-beamsplitter/half-wave-plate assembly 514 a long a direction substantially parallel to the beam axis of the illumination beam 508. Aligned with each polarizing beamsplitter film strip 520 is an elongated half-wave-plate strip 524. The first linearly polarized subbeam which passes through the polarizing-beamsplitter-film strip 520 also passes through the half-wave-plate strip 524. The half-wave-plate strip 524 rotates the polarization of the first linearly polarized subbeam by substantially 90° to coincide essentially with the polarization state of the second linearly polarized subbeam reflected from the reflective mirror strip 522. The beam polarizer assembly 510 thereby converts the unpolarized illumination beam 508 into a linearly polarized illumination beam 509 made up of an array of linearly polarized subbeams having essentially one polarization state, effectively without discarding light corresponding to any particular polarization state in the unpolarized illumination beam 508.

A generally piano convex beam-shaping/astigmatism-compensating lens 526 is positioned in the path of the linearly polarized illumination beam 509 from the beam-polarizer assembly 510. The beam-shaping/astigmatism-compensating lens 526 cooperates with the first and second lens arrays 512 and 516 of the beam-polarizer assembly 510 to focus and coalesce the various subbeams in the array of linearly polarized subbeams produced by the beam polarizer assembly 510 into a coalesced linearly polarized beam having an essentially rectangular cross-sectional shape. By so coalescing a plurality of subbeams into a coalesced linearly polarized illumination beam, the resulting illumination beam tends to have a uniform intensity over the entire cross-sectional area of the beam. In addition, the beam-shaping/astigmatism-compensating lens 526 is shaped to include cylindrical power to compensate for the astigmatism introduced by a grid support plate 572 of a wire-grid polarizing beamsplitter 570 discussed below, which is positioned in a tilted orientation in the path of linearly polarized color-component subbeams 542 R,G,B derived from the linearly polarized illumination beam 509 projected from the beam-shaping/astigmatism-compensating lens 526.

A rotating-prism swept-position color-band separation assembly 530 is positioned in the path of the linearly polarized illumination beam 509 from the beam polarizer assembly 510. Broadly, the rotating-prism swept-position color-band separation assembly 530 employs dichroic mirrors to separate the linearly polarized illumination beam into parallel red, green, and blue color-component subbeams, three rotating square prisms to sweep each color-component subbeam in lateral position crosswise to the direction of propagation of the subbeam repetitively and unidirectionally over a range of lateral positions while maintaining the propagation direction of the subbeam parallel to a given direction, and beam alignment and relay optics to align the three swept-position color-component subbeams parallel to one another in a laterally extending plane and to give each of the subbeams a band-like cross sectional shape with a lateral width of the band sufficiently narrow to preclude lateral overlap between adjacent subbeams.

The rotating prism swept-position color-band separation assembly 530 is broadly similar to a rotating prism assembly disclosed in U.S. Pat. No. 5,410,370 to Janssen, the specification of which is incorporated herein by reference. An alternative rotating-prism swept-position color band separation assembly 530' is illustrated in FIGS. 8 and 9 which is essentially functionally equivalent to the rotating-prism swept-position color band separation assembly 530 illustrated in FIG. 7. The alternative color-band separation assembly 530' will be described in detail below. Differences between the alternative rotating prism swept position color band separation assembly 530' of FIGS. 8 and 9 and the rotating prism swept position color band separator assembly 530 of FIG. 7 will then be noted.

Turning now to FIGS. 8 and 9, the rotating-prism swept-position color-band separation assembly 530' includes a rotating prism assembly 550 which includes a red-component square prism 552'R, a green-component square prism 552'G and a blue-component square prism 552'B. Each of the red, green and blue-component square prisms is a rectangular solid with a square cross section. The three square prisms 552 R,G,B are stacked one atop the other with central axes of the three prisms aligned. Adjacent prisms are offset from one another angularly about the central axis by substantially 30°. The three square prisms 552' R,G,B of the prism assembly are rotated about the central axis by a drive motor (not shown).

As shown best in FIG. 9, the rotating-prism swept-position color-band separation assembly 530 of the digital-image projector 500 includes a red-reflective/blue-green-transmissive dichroic mirror 532, a green-reflective/blue-transmissive dichroic mirror 538, and the beam redirection mirror 554' spaced apart along the direction of propagation of the linearly polarized illumination beam 509 and oriented at essentially 45° with respect to the direction of propagation of the illumination beam 509. The red-reflective/blue-green-transmissive dichroic mirror 532 reflects a red color component subbeam 540R of the incident illumination beam 509 in a direction essentially perpendicular to the direction of propagation of the illumination beam 509 and transmits a blue-green component subbeam 540GB in the direction of propagation of the incident illumination beam 509.

A red-component plano-convex lens 528R in the path of the red color component subbeam 540R following the red-reflective/blue-green-transmissive dichroic mirror 532 and an essentially identical blue-green-component plano-convex lens 528GB in the path of the blue-green component subbeam 540GB following the red-reflective/blue-green-transmissive dichroic mirror 532 are relay optics for focusing the final swept position linearly polarized color component subbeams on a reflective polarization modulator.

The green-reflective/blue-transmissive dichroic mirror 538 reflects a green component subbeam 540G of the blue-green component subbeam 540GB along a direction perpendicular to the incident blue-green component subbeam 540GB and transmits a blue-component subbeam 540B along the direction parallel to the blue-green component subbeam 540GB.

As shown best in FIG. 9, the red component subbeam 540R from the red-reflective/blue-green-transmissive dichroic mirror 532 is focused through the lens 528R onto a first planar face of the red-component square prism 552'R at the particular representative rotational angle of the rotating prism assembly 550 illustrated. In general, a beam of light in air incident at a nonzero angle of incidence upon a front face of a transparent material leaving an index of refraction greater than the index of refraction of air and having parallel planar front and rear faces is refracted upon entering the front face to make an angle of refraction in passing through the material which is closer to the normal at the front face than the angle of incidence. Upon exiting the rear face of the block of material, the beam is refracted so that the exit angle equals the original angle of incidence. The net result is that the exiting beam propagates in a direction parallel to the incident beam, but offset in position to account for traveling through the thickness of the material in a direction determined by the angle of refraction. Thus, as may be seen in FIG. 8, at the representative rotational angle of the rotating prism assembly 550 illustrated, the incident red component subbeam 540R intercepts a first face of the red-component square prism 552'R, passes into and through the prism at an angle of refraction with the first face of the prism, and emerges from an opposite face of the prism as a red-component swept-position subbeam 542R, laterally offset in position from the incident red component subbeam 540R. The green component subbeam 540G is reflected from the green-reflective/blue-transmissive dichroic mirror 538 onto a face of the green-component square prism 552'G. Since the incident green-component subbeam 540G intercepts the face of the green component square prism 552'G at normal incidence at the particular rotational angle shown in FIG. 8, the green-component subbeam 540G passes through the prism and emerges as a green-component swept-position subbeam 542G with a central ray coincident with the central ray of the incident green-component subbeam 540G. The blue component subbeam 540B is transmitted through the green-reflective/blue-transmissive mirror 538 and is redirected by the beam redirection mirror 554 to intercept a face of the blue-component square prism 552'B. At the particular rotational angle of the rotating prism assembly 550 illustrated in FIGS. 8 and 9, the incident blue component subbeam 540B is refracted at the face of the blue component prism and exits as a blue-component swept-position subbeam 542B laterally offset in position from the incident blue component subbeam 540B.

Turning again to FIG. 9, the red-component swept-position subbeam 542R passes through a red-component plano-convex relay lens 544R and is reflected by a beam redirection mirror 556' towards a green-reflective/red-transmissive dichroic mirror 558. The red-component swept-position subbeam 542R passes through the green-reflective/red-transmissive dichroic mirror 558, is focused by a red-green-component biconvex relay lens 560RG, and is directed onto a red-green-reflective/blue-transmissive dichroic mirror 562. The red-component swept-position subbeam 542R is reflected by the red-green-reflective/blue-transmissive dichroic mirror 562 and directed through a three-swept-subbeam plano-convex relay lens 566. The green-component swept-position subbeam 542G passes through a green-component plano-convex relay lens 544G and impinges upon the green-reflective/red-transmissive dichroic mirror 558, where it is reflected through the red-green-component biconvex relay lens 56ORG and onto the red-green-reflective/blue-transmissive dichroic mirror 562. The green-component swept-position subbeam 542G is reflected by the red-green-reflective/blue-transmissive dichroic mirror 562 and directed through the three-swept-subbeam plano-convex relay lens 566. As may be seen in FIG. 9, the blue-component swept-position subbeam 542B passes through a blue-component plano-convex relay lens 544B and a blue-component biconvex relay lens 560B and then passes in turn through the red-green-reflective/blue-transmissive dichroic mirror 562 and the three-swept-subbeam plano-convex lens 566.

Concerning differences between the rotating-prism swept position band separation assemblies 530 and 530' of FIGS.

7 and FIGS. 8 and 9, the red, green and blue-component square prisms 552R, 552G, 552B shown spaced apart laterally in the band separation assembly 530 of FIG. 7 rather than stacked vertically as in the band separation assembly 530' of FIGS. 8 and 9. Beam redirection mirrors 554' and 556' are repositioned in FIG. 7 from the position of beam redirection mirrors 554' and 556' in FIG. 9.

In the rotating prism swept position color band separation assembly 530 of FIG. 7, the red, green, and blue-component swept-position subbeams 542 R,G,B are displaced in a lateral direction relative to one another upon leaving the red-green-reflective/blue-transmissive dichroic mirror 562. Rotation of the three square prisms 552 R,G,B in synchronism about the respective central axes of the prisms causes the lateral position of each of the red, green, and blue-component swept-position subbeams to shift laterally from a first lateral limit position to a second lateral limit position and then reappear at the first lateral limit position to repeat the lateral shift. Because of the substantially 30° relative angular offset of the red, green, and blue-component square prisms 552 R,G,B of the prism assembly 550, the red, green, and blue component swept-position subbeams 542 R,G,B are laterally displaced relative to one another at all times as they carry out the repetitive lateral translations generated by the rotation of the prism assembly. As noted above, the first and second lens arrays 512 and 516 of the beam polarizing assembly 510 and the plano-convex beam-shaping/astigmatism-compensating lens 526 cause the red-component swept-position subbeam 542R emerging from the red-component square prism 552R to have a generally rectangular band-like cross-sectional shape which is elongated in a direction perpendicular to the direction along which the subbeam is swept. Likewise, the green-component swept-position subbeam 542G and the blue-component swept-position subbeam 542B have essentially identical generally rectangular band-like cross-sectional shapes. The cross-sectional width of each of the three component subbeams in the direction of sweeping is sufficiently narrow that a non-illuminated lateral gap is provided between each pair of adjacent color-compound subbeams so that the subbeams do not overlap spatially at any instant as the three subbeams are swept through the translation cycle.

Turning again to FIG. 7, the three laterally displaced red, green, and blue-component swept-position subbeams 542 R,G,B pass through the three-swept-subbeam plano-convex relay lens 506 and a trimming sheet polarizer 566 oriented to pass linearly polarized light of an orientation parallel to the nominal direction of polarization of the beam produced by the beam-polarizer assembly 510.

A wire-grid polarizing beamsplitter 570 is positioned in the path of the red, green, and blue component swept-position subbeams 542 R,G,B. The wire-grid polarizing beamsplitter 570 includes a grid-support plate 572 and a wire grid 574 mounted on a grid-support face 576 of the support plate 572. The grid-support face 576 of the support plate 572 is essentially optically flat. The wire-grid polarizing beamsplitter 570 is oriented at an essentially 45° angle with respect to the direction of propagation of the color-component swept-position subbeams 542 R,G,B, and at an essentially 45° angle with respect to the sweep direction of the color-component swept-position subbeams 542 R,G,B. The wires of the wire grid 574 extend perpendicular to the plane of the page of FIG. 7. The wire grid 574 on the face 576 of the support plate 572 faces away from the direction of propagation of the illumination color-component swept-position subbeams 542 R,G,B coming from the three-swept-subbeam plano-convex lens 566 and the trimming polarizer 568. The direction of the E-field of the linearly polarized color component swept-position subbeams 542 R,G,B incident upon the polarizing beamsplitter 570 is oriented substantially perpendicular to the direction of linear extent of the parallel wires of the wire grid 574 to permit the subbeams to pass through the wire grid.

Figure 10:
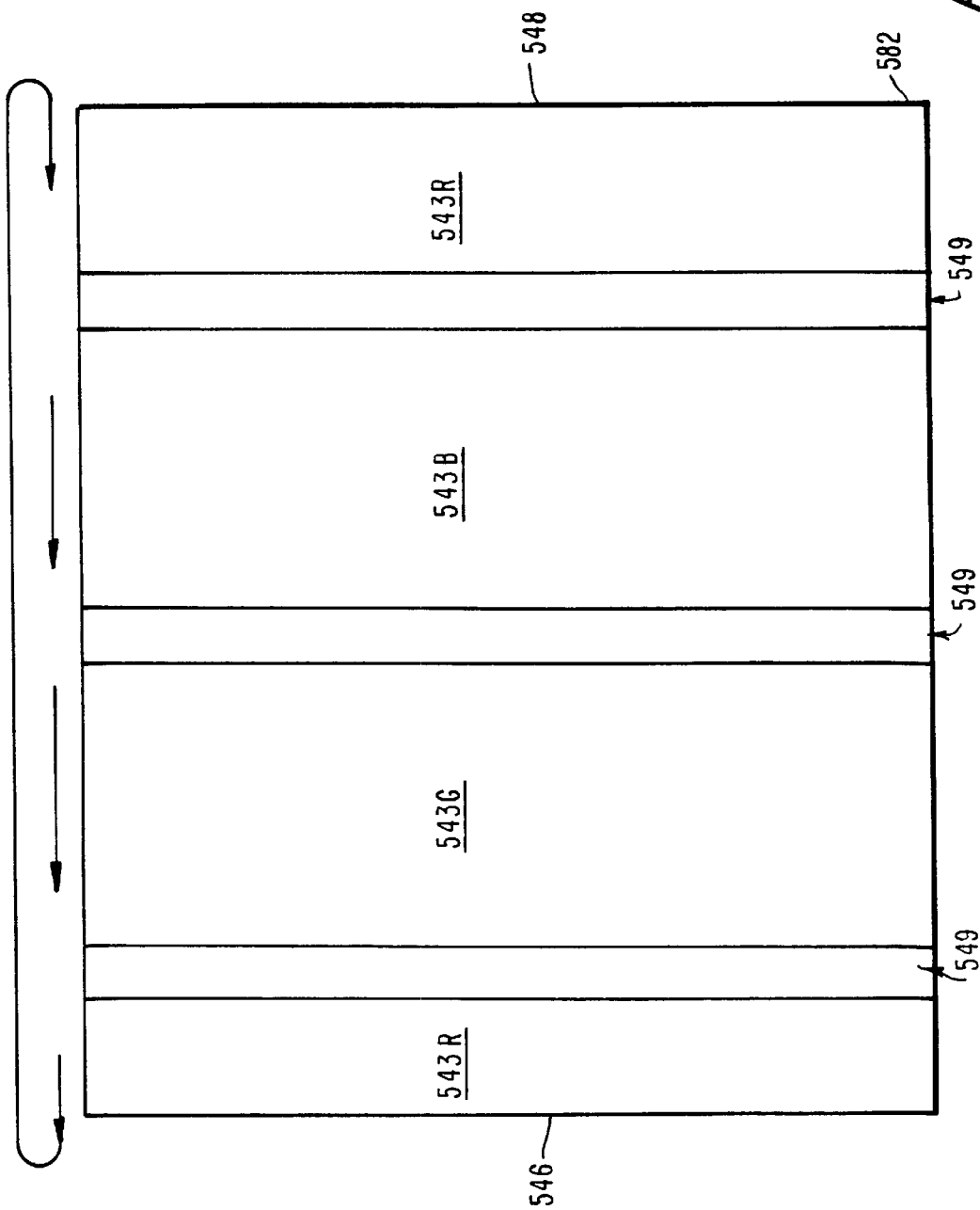
FIG. 10 is a schematic drawing of a modulator face of a reflective polarization modulator of the preferred digital image projector of FIG. 7 illuminated with red, green and blue-component swept position subbeams.

A reflective polarization modulator 580 is positioned with a polarization modulator face 582 facing the polarizing beamsplitter 570. The reflective polarization modulator 590 is adapted to reflect and spatially modulate the polarization of linearly polarized light falling on the polarization modulator face 582 in accordance with image encoding signals applied to the polarization modulator 580. As shown in FIG. 10, illumination of the polarization modulator face 582 with a color-component swept-position subbeam 542 R,G,B produces a corresponding band of color 543 R,G.B on the polarization modulator face 582 as a result of the cross-sectional shape of the subbeam. As explained in U.S. Pat. No. 5,410,370 to Janssen, signals encoding red, green, and blue-component band-portions of a desired color image are applied to the polarization modulator 580 in synchronism with the rotation of the square prisms 552 R,G,B and the sweeping of the red, green, and blue color bands 543 R,G,B across the polarization modulator face 582 produced by the color-component swept-position subbeams 542 R,G,B, so that each of the color-component subbeams at each instant is spatially polarization modulated with the corresponding color component of the corresponding band-portion of the desired image at that instant. At any given instant, the polarization modulator face 582 of the polarization modulator 580 is illuminated by all three parallel red, green, and blue color bands 543 R,G.B produced by the linearly polarized color-component swept-position subbeams 542 R,G, B—although, as may be seen in FIG. 10, any one band may be divided into two parts as the corresponding color-component subbeam passes from a second lateral limit position 546 back to a first lateral limit position 548. The portion of the polarization modulator face 582 illuminated by a particular one of the three bands is driven by image encoding signals applied to the polarization modulator 580 to modulate spatially the linearly polarized color-component swept-position subbeam producing such band in accordance with the corresponding color component image of the desired final image. The non-illuminated gap 549 provided between each pair of adjacent color-component bands provides a set-up time to enable pixel areas on the polarization-modulator face to be switched from the polarizing activity states corresponding to the color-component image of a departed band to the polarizing activity states corresponding to the color-component image of an arriving band. As any given colored band sweeps across the polarization modulator face 582, the polarization modulator 580 is driven to activate the pixel areas in area of the band in accordance with the portion of the corresponding color component image illuminated by the band. Consequently, the polarization modulator 580 must be driven by image encoding signals at roughly three times the rate of a polarization modulator which is dedicated to a single color component.

Any pixel area on the polarization modulator 582 which corresponds to a pixel location in the projected image which is to remain unilluminated in a particular color is set to a polarizing-activity state which does not actively alter the polarization of linearly polarized light falling on the area. A pixel area on the polarization modulator 582 which corresponds to a pixel location in the projected image which is to be illuminated in a particular color component is driven to a polarizing-activity state to rotate actively the polarization of linearly polarized light falling on the pixel area to an extent which corresponds to the desired degree of illumination. For each incident color-component swept-position subbeam 542 R,G,B which illuminates a portion of the polarization modulator face 582 of the polarization modulator 580, a spatially selectively polarization modulated color-component swept-position subbeam is reflected by the polarization modulator face 582 back towards the polarization beamsplitter 570. Components of each such modulator-reflected swept-position subbeam whose direction of polarization was not changed by the reflective polarization modulator 580 are linearly polarized with E-fields extending perpendicular to the direction of the wires of the wire-grid polarizing beamsplitter 570 and consequently pass through the polarizing beamsplitter and propagate back towards the illumination beam source assembly 502. Components of each such modulator-reflected color-component swept-position subbeam whose polarization was rotated by the reflected polarization modulator 580 to some extent have E-field components which extend parallel to the direction of the wires of the grid and to such an extent are reflected by the wire-grid polarizing beamsplitter 570 to form a corresponding beamsplitter-reflected color-component swept-position subbeam 594 R,G,B.

A projection-lens assembly 590 has a projection-lens input port 592 positioned to intercept and receive light reflected from the polarization beamsplitter 570. A trimming analyzer sheet polarizer 593 is located between the projection-lens input port 592 and the wire grid polarizing beamsplitter 570. Each of the three beamsplitter-reflected color-component swept-position subbeams 594 R,G,B effectively constitutes a light-pixel-polarization-state, linearly polarized color component subbeam bearing a color component of the desired image. The projection lens assembly 590 projects the three light-pixel-polarization-state color-component subbeams onto a display screen (not shown) for viewing. The rate of repetitive scanning of the three subbeams is sufficiently high that, to a human viewer, the projected image appears to be a complete, full-color image. The optical flatness of the grid-support face 576 of the grid-support plate 572 of the polarizing beamsplitter 570 and the orientation of the grid-support face 576 to permit direct reflection of the light-pixel-polarization-state color component subbeams 594 R,G,B from the polarization modulator 582 into the optical input port 592 of the projection lens 590 without having to pass through the transparent beam-support plate 572 tend to insure high spatial resolution of the projected image.

Figure 11:
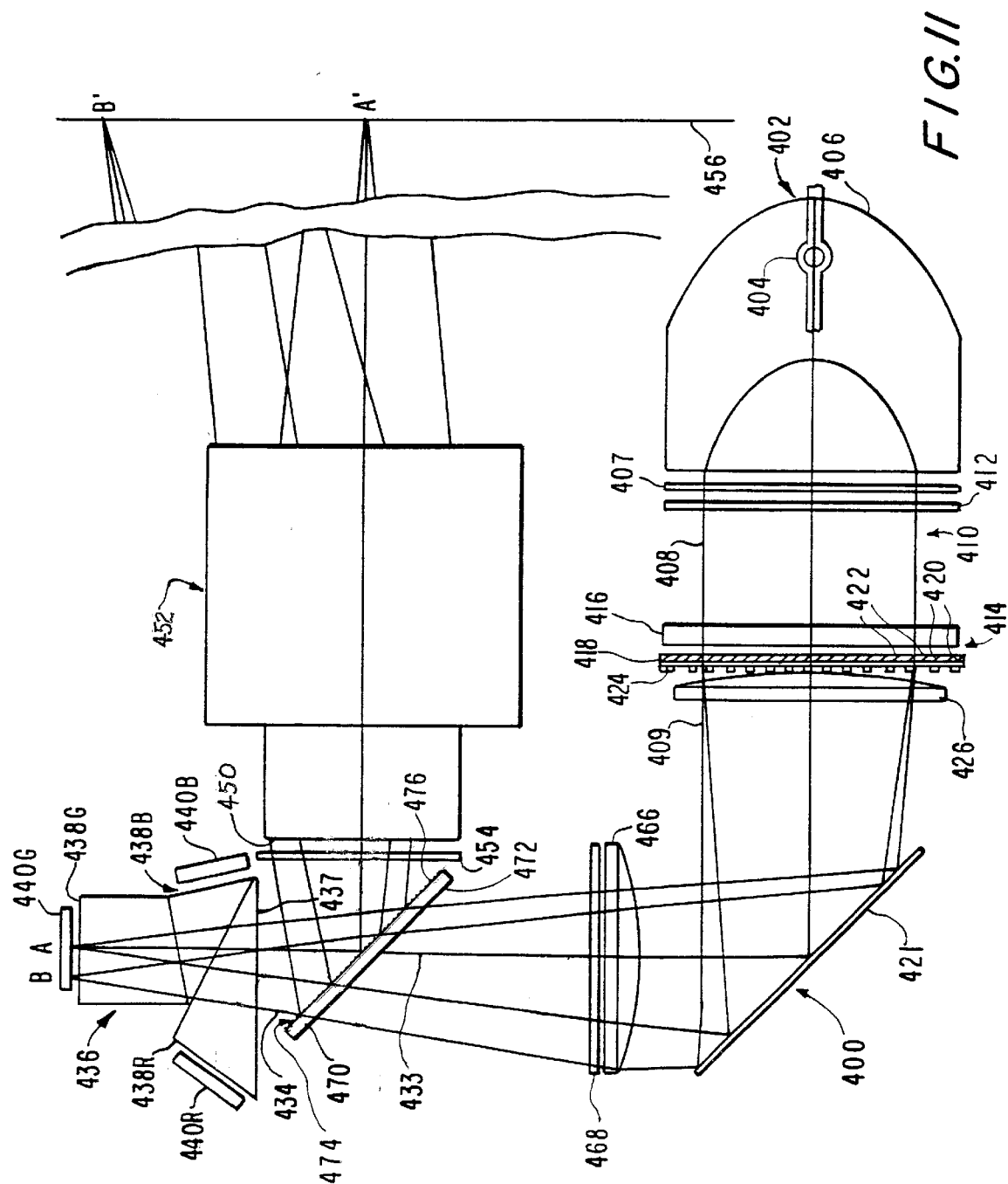
FIG. 11 is a simplified schematic optical diagram of a second preferred digital image projector of the invention.

Turning now to FIG. 11, a second preferred digital-image projector 400 includes an illumination-beam source assembly 402 which includes a high-intensity lamp 404 and a parabolic reflector 406 which forms an illumination beam 408 of unpolarized white-spectrum light for the projector. An ultraviolet, infrared, and spectral notch filter assembly 407 is placed in the path of the illumination beam 408 to remove light of ultraviolet and infrared frequencies from the beam and to impart a desired color spectral shape to the frequency spectrum of the beam.

A light-conserving beam-polarizer assembly 410 is located in the path of the unpolarized illumination beam 408 of a type broadly similar to a beam polarizer described in U.S. Pat. No. 5,986,809 to Itoh and Hashizume. The beam-polarizer assembly 410 includes a first lens array 412 consisting of a rectangular array of substantially rectangular plano-convex lens elements and a polarizing-beamsplitter/half-wave-plate assembly 414 positioned in the focal plane of focused subbeams produced by the first lens array 412.

The polarizing-beamsplitter/half-wave-plate assembly 414 includes a second lens array 416, a plurality of pairs of alternating elongated polarizing-beamsplitter-film strips 420 and elongated reflective mirror strips 422 extending linearly parallel to one another in a direction perpendicular to the central ray of the illumination beam 408 and inclined at a substantially 45° angle with respect to the central ray of the beam 408, and a plurality of elongated half-wave-plate strips 424 aligned with corresponding polarizing beamsplitter film strips 420. The operation of an essentially functionally similar beam polarizer assembly 510 was discussed above in connection with FIG. 7. For conciseness, that discussion will not be repeated here. The beam-polarizer assembly 410 converts the unpolarized illumination beam 408 into a linearly polarized illumination beam 409 made up of an array of linearly polarized subbeams having essentially one polarization state, effectively without discarding light corresponding to any particular polarization state in the unpolarized illumination beam 408.

A generally plano convex beam-shaping/astigmatism-compensating lens 426 is located in the path of the illumination beam 409 and serves to focus and coalesce the various subbeams in the array of linearly polarized subbeams produced by the beam-polarizing assembly 410 into a coalesced linearly polarized illumination beam. By so coalescing a plurality of subbeams into coalesced linearly polarized illumination beam, the resulting illumination beam tends to have a uniform intensity over the entire cross-secontional area of the beam. In addition, the beam-shaping/astigmatism-compensating lens 426 is shaped to include cylindrical power to compensate for astigmatism introduced by a tilted grid-support plate 472 discussed below which is located in the path of the illumination beam 409.

An illumination beam redirection mirror 421 reflects the linearly polarized illumination beam 409 to provide for physical compactness of the optical layout of the projector 400. A plano-convex relay lens 466 and a trimming sheet polarizer 468 are located in the path of the linearly polarized illumination beam 409 following the illumination beam redirection mirror 421. The trimming polarizer 468 is oriented to pass linearly polarized light of an orientation parallel to the nominal direction of polarization of the beam produced by the beam-polarizer assembly 410.

A visible-spectrum wire-grid polarizing beamsplitter 470 is placed in the path of the focused illumination beam at an angle of essentially 45° with respect to a principal axis 433 of the projector. The wire-grid polarizing beamsplitter 470 includes a grid-support plate 472 and a wire grid 474 mounted on a grid-support face 476 of the support plate 472. The grid-support face 476 of the support plate 472 is essentially optically flat. The wire grid 474 on the face 476 of the support plate 472 faces away from the direction of propagation of the incident linearly polarized illumination beam 409 coming from the trimming polarizer 468. The beam-polarizer assembly 410, the trimming polarizer 468, and the direction of the linear extent of the wires of the wire-grid polarizing beamsplitter 470 are oriented with respect to one another so that the linearly polarized illumination beam 409 beam incident upon the wire-grid polarizing beamsplitter 470 is linearly polarized with an E-field extending perpendicular to the direction of the linear extent of the wires of the wire grid 474 of the polarizing beam-splitter 470 so that the illumination beam 409 passes through the polarizing beamsplitter 470 as a beamsplitter-transmitted linearly polarized illumination beam 434.

The beamsplitter-transmitted linearly polarized illumination beam 434 falls upon a primary-color dividing/ combining prism assembly 436. The primary color dividing/combining prism assembly 436 includes three prisms with dichroic coatings on faces of the prisms and is adapted to divide a beam of white-spectrum light entering the prism assembly 436 into component beams of respectively red, green, and blue light. Since such primary color dividing/combining prism assemblies are conventional, the prism assembly will not be described in detail. The primary-color-prism dividing/combining assembly has a white light input/output face 437, a red component-beam output/input face 438R, a green component-beam output/input face 438G and a blue component-beam output/input face 438B. Adjacent to the red component beam output/input face 438R is a red image component reflective liquid-crystal polarization modulator 440R. A green image component reflective liquid-crystal polarization modulator 440G and a blue image component reflective liquid-crystal polarization modulator 440B are located adjacent respectively the green component beam output/input face 438G and the blue component beam output/input face 440B. Each of the red, green, and blue image-component reflective polarization modulators 440 R,G,B is adapted to modulate spatially selectively the polarization of a linearly polarized beam falling upon a polarization modulator face of the polarization modulator on a pixel-by-pixel basis in accordance with digital signals applied to the modulators which encode a color image component of a desired colored image. Such reflective liquid crystal polarization modulators are conventional.

The digital signals encoding a particular color component of a desired digital image applied to the corresponding color polarization modulator are encoded such that pixel areas on the polarization modulator face which corresponds to areas in the projected image which are to remain unilluminated in the particular color are set to a polarizing activity state to not alter the polarization of a beam falling at normal incidence upon the pixel areas. Pixel areas which correspond to areas in the projected image which are to be illuminated in a particular color component are driven to a polarizing activity state to rotate the polarization of the light falling on the pixel areas to an extent which corresponds to the degree of illumination. The spatially selectively polarization modulated color component light beam formed by a particular color component polarization modulator 440 is reflected back into the corresponding color-component beam output/input face 438 of the primary color prism assembly 436. The three color component light beams retrace their respective paths through the prism assembly 436 and exit as a combined composite light beam from the white light input/output face 437 of the prism assembly.

The composite beam propagates from the white light input/output port 437 to the wire-grid polarizing beamsplitter 430. Components of the composite beam whose direction of polarization was not changed by the reflective polarization modulators 440 are linearly polarized with E-fields extending perpendicular to the direction of the wires of the wire grid of the wire-grid polarizing beamsplitter 430 and consequently pass through the polarizing beamsplitter and propagate back towards the lamp 402. Components of the composite beam whose polarization was rotated by a reflective polarization modulator 440 to some extent have E-field components which extend parallel to the direction of the wires of the wire grid and to such an extent are reflected by the wire-grid polarizing beamsplitter. Light which is reflected from the face of the wire-grid polarizing beamsplitter proceeds to an input port 492 of a projection lens 490 of the digital-image projector 400. A trimming polarization analyzer sheet filter 454 is placed between the wire-grid polarizing beamsplitter 470 and the input port 492 of the projection lens 490 to improve the light-to-dark contrast ratio. The projection lens 490 projects the desired composite image carried by the rotated polarization component of the composite beam passing out of the primary color dividing/combining prism assembly onto a display screen 456 for viewing. The optical flatness of the grid-support face 476 of the grid-support plate 472 of the polarizing beamsplitter 470 and the orientation of the grid-support face 476 to permit direct reflection of the light-pixel-polarization-state color component subbeam from the white light input/output face 437 of the prism assembly into the optical input port 492 of the projection lens 490 without having to pass through the transparent beam-support plate 472 tend to insure high spatial resolution of the projected image.

It is not intended to limit the present invention to the specific embodiments described above. It is recognized that changes may be made in the invention specifically described herein without departing from the scope and teachings of the instant invention, and it is intended to encompass all other embodiments, alternatives, and modifications consistent with the invention.

What is claimed:

1. In a digital-image projector comprising:
   (a) an illumination-light source lamp for generating white-spectrum illumination light;
   (b) illumination-beam forming means for receiving illumination light generated by the source lamp and forming from such light a white-spectrum illumination beam;
   (c) color-band-separation means for dividing the input white-spectrum illumination beam into three spatially separated color-component illumination subbeams;
   (d) reflective digital-image-encoding polarization modulator means for spatially modulating the polarization of incident linearly polarized color-component illumination subbeams upon reflection of the subbeams in accordance with corresponding color-component images of a desired color digital image to form reflected color-component image-encoded-polarization subbeams;
   (e) projection lens means for projecting color-image bearing light rays for viewing the desired color image; and
   (f) a plate-supported, surface-mounted fixed-polarization-axis thin-polarizer polarizing beamsplitter for polarization-state-selectively directing illumination light rays incident upon the beamsplitter into dark-pixel-polarization-state polarized light rays for forming linearly polarized color-component illumination subbeams incident upon the reflective digital-image-encoding polarization modulator means and for polarization-state-selectively dividing image-encoded-polarization light rays incident upon the beamsplitter drawn from reflected color-component image-encoded-polarization subbeams from the reflective digital-image-encoding polarization modulator means into dark-pixel-polarization-state polarized negative-image bearing light rays and light-pixel-polarization-state polarized color-image bearing light rays for forming the desired color image, said polarizing beamsplitter comprising a transparent polarizer-support plate and a fixed-polarization-axis polarizer mounted on a substantially optically flat outer face of the polarizer-support plate which defines a polarizer-support face, the fixed-polarization axis polarizer being thin in a dimension perpendicular to the polarizer-support face, the polarizing beamsplitter having defined with respect thereto an illumination-beam-reception axis, a dark-pixel-polarization-state polarized beam axis, and a light-pixel-polarization-state polarized beam axis, the illumination light rays incident upon the beamsplitter propagating in a direction substantially parallel to the illumination-beam-reception axis, the image-encoded-polarization light rays incident upon the beamsplitter propagating in a direction substantially parallel to the dark-pixel-polarization-state polarized beam axis, and the light-pixel-polarization-state polarized color-image bearing light rays divided from the image-encoded-polarization light rays by the beamsplitter propagating in a direction substantially parallel to the light-pixel-polarization-state polarized beam axis, a polarizer-support-face normal being defined to project outwardly from the polarizer-support face of the polarizer-support plate in a direction perpendicular to the polarizer-support face;

the improvement which comprises:

positioning and orienting the fixed-polarization-axis polarizing beamsplitter with the dark-pixel-polarization-state polarized beam axis extending outwardly from the fixed-polarization-axis polarizer mounted on the polarizer-support face of the polarizer-support plate, a polarized-beam-axis angle being defined as an angle between the dark-pixel-polarization-state polarized beam axis and the polarizer-support-face normal, the polarized-beam-axis angle being substantially greater than zero degrees, the illumination-beam-reception axis extending in a direction effectively parallel to the direction of the dark-pixel-polarization-state polarized beam axis outwardly from a face of the polarizer-support plate opposing the polarizer-support face, the light-pixel-polarization-state polarized beam axis extending outwardly from the polarizer-support face of the polarizer-support plate in a plane of incidence defined by the dark-pixel-polarization-state polarized beam axis and the polarizer-support-face normal and making an angle of reflection with the polarizer-support-face normal equal to the polarized-beam-axis angle, the fixed-polarization-axis polarizing beamsplitter being oriented to receive the illumination light rays propagating towards the polarizing beamsplitter substantially parallel to the illumination-beam reception axis and through the transparent polarizer-support plate to the fixed-polarization-axis polarizer mounted on the polarizer-support face of the polarizer-support plate, to direct the dark-pixel-polarization-state light rays to propagate outwardly from the polarizer-support face substantially parallel to the dark-pixel-polarization-state polarized beam axis, to receive the image-encoded-polarization light rays propagating towards the beamsplitter substantially parallel to the dark-pixel-polarization-state polarized beam axis directly upon the fixed-polarization-axis polarizer mounted on the polarizer-support face of the polarizer-support plate without passing through the polarizer-support plate, to divide the image-encoded-polarization light rays into the dark-pixel-polarization-state polarized negative-image bearing light rays propagating through the transparent polarizer-support plate and away from the polarizing beamsplitter substantially parallel to the illumination-beam-reception axis and the light-pixel-polarization-state polarized color-image bearing light rays propagating away from the polarizer-support face substantially parallel to the light-pixel-polarization-state polarized beam axis without passing through the polarizer-support plate for projection by the projection lens means.

2. A digital-image projector, comprising:

(a) an illumination-light source lamp for generating white-spectrum illumination light;

(b) illumination-beam forming optics positioned to receive illumination light generated by the source lamp and adapted to form from such light a white-spectrum illumination beam propagating substantially along an illumination-beam axis;

(c) a color-band-separation subbeam-position-sweeper assembly having a white-spectrum illumination beam input optical port and a color-component swept-position separated-triple-subbeam output optical port, the color-band-separation subbeam-position-sweeper assembly being adapted to accept an input white-spectrum illumination beam propagating substantially along the illumination-beam axis into the white-spectrum illumination beam input optical port, divide the input white-spectrum illumination beam into three spatially separated color-component subbeams, sweep the position of each of the color-component subbeams repetitively between first and second limit positions while maintaining the subbeams in a substantially nonoverlapping relationship to form three spatially separated color-component swept-position subbeams, and project the three spatially separated color-component swept-position subbeams from the color-component swept-position separated-triple-subbeam output optical port, a swept-position-subbeam central axis being defined with respect to collectively the three spatially separated color-component swept-position subbeams projected from the color-component swept-position separated-triple-subbeam output optical port of the color-band-separation subbeam-position-sweeper assembly, each of such color-component swept-position subbeams propagating in a direction substantially parallel to the swept-position-subbeam central axis as the position of the subbeam is swept in operation;

(d) a reflective three-moving-image-area digital-image-encoding polarization modulator including an essentially planar array of reflective-polarization-modulation pixel areas defining a modulator face of the polarization modulator and an image-encoding signal input port for receiving image-encoding signals for selectively setting polarizing-activity states of selectively addressed pixel areas, each reflective-polarization-modulation pixel area being adapted to modulate selectively the polarization of linearly polarized light falling on the pixel area in accordance with the polarizing-activity state of the pixel area, the modulator face of the polarization modulator being adapted to have defined thereon in operation three substantially nonoverlapping color-component swept-position image areas, each of the color-component swept-position image areas corresponding to a color-component illumination area illuminated by an associated color-component swept-position subbeam projected in operation at substantially normal incidence onto the modulator face, each one of the color-component swept-position image areas in operation being defined to sweep repetitively across the modulator face simultaneously with the sweeping of the other two color-component swept-position image areas in accordance with the sweeping of the associated color-component swept-position subbeams, the polarization modulator being adapted to receive three-moving-image-area color-component image-encoding signals at the image-encoding signal port and, for each of the three color-component swept-position image areas, selectively set the polarizing-activity states of reflective-polarization-modulation pixel areas associated with the color-component swept-position image area on the fly as the image area sweeps across the modulator face to polarizing activity states which encode over the moving image area a corresponding color-component moving image-area portion of a desired full-color, full-size image, so that the corresponding linearly polarized color-component swept-position subbeam projected onto and swept across the modulator face to illuminate the color-component swept-position image area of the modulator face at substantially normal incidence is reflected from the moving image area at substantially normal incidence with the polarization spatially modulated at any instant to encode the corresponding color-component image-area portion of the desired image at that instant, so that over a sweep-cycle repetition time to sweep across the modulator face the color-component swept-position subbeam is reflected from the modulator face with the polarization continuously modulated to encode in a swept-image fashion the corresponding color component of the desired full-size image;

(e) projection lens optics for accepting three color-component swept-position image subbeams propagating substantially parallel to a projection-lens-input-port axis into a projection-lens input optical port and projecting the three color-component swept-position image subbeams from a projection-lens output optical port for viewing the image; and (f) a plate-supported, surface-mounted fixed-polarization-axis thin-polarizer polarizing beamsplitter, said polarizing beamsplitter comprising a transparent polarizer-support plate and a fixed-polarization-axis polarizer mounted on an essentially optically flat outer face of the polarizer-support plate which defines a polarizer-support face, the fixed-polarization axis polarizer being thin in a dimension perpendicular to the polarizer-support face, the polarizing beamsplitter having defined with respect thereto an illumination-beam-reception axis, a dark-pixel-polarization-state polarized beam axis, and a light-pixel-polarization-state polarized beam axis, a polarizer-support-face normal being defined to project outwardly from the polarizer-support face of the polarizer-support plate in a direction perpendicular to the polarizer-support face, the dark-pixel-polarization-state polarized beam axis extending outwardly from the polarizer-support face of the polarizer-support plate, a polarized-beam-axis angle being defined as an angle between the dark-pixel-polarization-state polarized beam axis and the polarizer-support-face normal, the polarized-beam-axis angle being substantially greater than zero degrees, the illumination-beam-reception axis extending in a direction effectively parallel to the direction of the dark-pixel-polarization-state polarized beam axis outwardly from a face of the polarizer-support plate opposing the polarizer-support face, the light-pixel-polarization-state polarized beam axis extending outwardly from the polarizer-support face of the polarizer-support plate in a plane of incidence defined by the dark-pixel-polarization-state polarized beam axis and the polarizer-support-face normal and making an angle of reflection with the polarizer-support-face normal equal to the polarized-beam-axis angle, the fixed-polarization-axis polarizing beamsplitter being adapted to receive three spatially separated color-component swept-position subbeams propagating towards the polarizing beamsplitter substantially parallel to the illumination-beam reception axis and through the transparent polarizer-support plate to the fixed-polarization-axis polarizer mounted on the polarizer-support face of the polarizer-support plate, to divide from the three spatially separated color-component swept-position subbeams by means of the fixed-polarization-axis polarizer on the polarizer-support face three linearly polarized spatially separated color-component swept-position dark-pixel-polarization-state subbeams propagating outwardly from the polarizer-support face substantially parallel to the dark-pixel-polarization-state polarized beam axis, to receive three spatially separated color-component swept-position composite image subbeams propagating towards the beamsplitter substantially parallel to the dark-pixel-polarization-state polarized beam axis directly upon the fixed-polarization-axis polarizer mounted on the polarizer-support face of the polarizer-support plate without passing through the polarizer-support plate, each color-component swept-position composite image subbeam containing dark-pixel-polarization-state linearly polarized light bearing a color-component negative image and light-pixel-polarization-state linearly polarized light bearing a desired color-component image, to divide each color-component swept-position composite image subbeam into a color-component swept-position dark-pixel-polarization-state linearly polarized beam bearing the color-component negative image propagating through the transparent polarizer-support plate and away from the polarizing beamsplitter substantially parallel to the illumination-beam-reception axis and a color-component swept-position light-pixel-polarization-state linearly polarized beam bearing the desired color image propagating outwardly from the polarizer-support face substantially parallel to the light-pixel-polarization-state polarized beam axis without passing through the polarizer-support plate, the illumination-beam reception axis of the polarizing beamsplitter being effectively aligned with the swept-position-subbeam central axis of the color-band-separation subbeam-position-sweeper assembly, the dark-pixel-polarization-state polarized beam axis of the polarizing beamsplitter being effectively aligned with a normal to the modulator face of the polarization modulator, and the light-pixel-polarization-state polarizing beam axis of the polarizing beamsplitter being effectively aligned with the projection-lens-input-port axis of the projection lens optics.

3. A digital-image projector, comprising:

(a) an illumination-light source lamp for generating white-spectrum illumination light;

(b) illumination-beam forming optics positioned to receive illumination light generated by the source lamp and adapted to form from such light an illumination beam propagating substantially along an illumination beam axis;

(c) a beam color dividing/combining prism assembly having a composite beam input/output optical port and three primary color output/input optical ports, the beam color dividing/combining prism assembly being adapted to accept a white-spectrum input beam propagating substantially along a composite-beam input/output axis into the composite beam input/output optical port, divide the white-spectrum input beam into three component primary-color output beams, and project each of the component primary-color output beams respectively from the corresponding primary-color output/input optical port and to accept respectively input beams of each of the three primary colors into the corresponding one of the three primary color output/input optical ports, combine the three primary-color input beams into a composite output beam, and project the composite output beam from the composite beam input/output optical port of the prism assembly;

(d) three reflective digital-image-encoding polarization modulators, each reflective polarization modulator being positioned reflectively facing a corresponding one of the three primary color output/input optical ports of the beam color dividing/combining prism assembly, each reflective polarization modulator being adapted to reflect and spatially modulate the polarization of a polarized component primary-color output beam projected from the corresponding primary-color output/input optical port onto the modulator in accordance with a corresponding primary-color component of a desired digital image to form a reflected image-encoded-polarization primary-color input beam directed into the corresponding primary color output/input optical port;

(e) projection lens optics for accepting an image beam propagating substantially along a projection-lens-input-port axis into a projection-lens input optical port and projecting the image beam from a projection-lens output optical port for viewing the image; and (f) a plate-supported, surface-mounted fixed-polarization-axis thin-polarizer polarizing beamsplitter, said polarizing beamsplitter comprising a transparent polarizer-support plate and a fixed-polarization-axis polarizer mounted on a substantially optically flat outer face of the polarizer-support plate which defines a polarizer-support face, the fixed-polarization axis polarizer being thin in a dimension perpendicular to the polarizer-support face, the polarizing beamsplitter having defined with respect thereto an illumination-beam-reception axis, a dark-pixel-polarization-state polarized beam axis, and a light-pixel-polarization-state polarized beam axis, a polarizer-support-face normal being defined to project outwardly from the polarizer-support face of the polarizer-support plate in a direction perpendicular to the polarizer-support face, the dark-pixel-polarization-state polarized beam axis extending outwardly from the polarizer-support face of the polarizer-support plate, a polarized-beam-axis angle being defined as an angle between the dark-pixel-polarization-state polarized beam axis and the polarizer-support-face normal, the polarized-beam-axis angle being substantially greater than zero degrees, the illumination-beam-reception axis extending in a direction effectively parallel to the direction of the dark-pixel-polarization-state polarized beam axis outwardly from a face of the polarizer-support plate opposing the polarizer-support face, the light-pixel-polarization-state polarized beam axis extending outwardly from the polarizer-support face of the polarizer-support plate and making an angle of reflection with the polarizer-support-face normal equal to the polarized-beam-axis angle, the fixed-polarization-axis polarizing beamsplitter being adapted to receive an illumination beam propagating towards the polarizing beamsplitter substantially along the illumination-beam reception axis and through the transparent polarizer-support plate to the fixed-polarization-axis polarizer mounted on the polarizer-support face of the polarizer-support plate, to divide from the illumination beam by means of the fixed-polarization-axis polarizer on the polarizer-support face a linearly polarized dark-pixel-polarization-state beam propagating outwardly from the polarizer-support face substantially along the dark-pixel-polarization-state polarized beam axis, to receive a composite image beam containing dark-pixel-polarization-state linearly polarized light bearing a color-negative image and light-pixel-polarization-state linearly polarized light bearing a desired color image propagating towards the beamsplitter substantially along the dark-pixel-polarization-state polarized beam axis directly upon the fixed-polarization-axis polarizer mounted on the polarizer-support face of the polarizer-support plate without passing through the polarizer-support plate, to divide the composite beam into a dark-pixel-polarization-state linearly polarized beam bearing the color-negative image propagating through the transparent polarizer-support plate and away from the polarizing beamsplitter substantially along the illumination-beam-reception axis and a light-pixel-polarization-state linearly polarized beam bearing the desired color image propagating outwardly from the polarizer-support face substantially along the light-pixel-polarization-state polarized beam axis without passing through the polarizer-support plate, the illumination-beam reception axis of the polarizing beamsplitter being effectively aligned with the illumination beam axis of the illumination-beam forming optics, the dark-pixel-polarization-state polarized beam axis of the polarizing beamsplitter being effectively aligned with the composite-beam input/output port axis of the beam color dividing/combining prism assembly, and the light-pixel-polarization-state polarizing beam axis of the polarizing beamsplitter being effectively aligned with the projection-lens-input-port axis of the projection lens optics.

4. The digital-image projector according to any of claim 1,2, or 3 in which the illumination-beam forming optics has a numerical aperture of at least about 0.1 and the polarizing beamsplitter has an acceptance angle for receiving the illumination beam corresponding to a numerical aperture of at least about 0.1.

5. The digital image projector of claim 4 in which the illumination-beam forming optics has a numerical aperture in the range of from about 0.1 to about 0.25 and the polarizing beamsplitter has an acceptance angle for receiving the illumination beam corresponding to a numerical aperture in the range of from about 0.1 to about 0.25.

6. The digital-image projector according to any of claim 1,2, or 3 in which the polarized-beam-axis angle is in the range of from about 20° to about 70°.

7. The digital-image projector of claim 6 in which the polarized-beam-axis angle is approximately 45°.

8. The digital-image projector according to any of claim 1,2, or 3 in which the illumination-beam forming optics includes an astigmatism compensation element in a path of the illumination beam for compensating for an astigmatism introduced in the illumination beam upon passing through the transparent polarizer-support plate after striking the plate at an angle of incidence equal to the polarized-beam-axis angle.

9. The digital-image projector according to any of claim 1, 2, or 3 in which the polarizer-support face of the polarizer-support plate of the fixed-polarization axis polarizing beamsplitter is flat to within five wavelengths of visible light per inch.

10. The digital-image projector of claim 3 in which each of the reflective digital-image-encoding polarization modulators is a reflective liquid crystal display (RLCD) or a liquid crystal on silicon display (LCoS).

11. The digital-image projector of according to any of claim 1, 2, or 3 in which the plate-supported, surface-mounted fixed-polarization-axis thin-polarizer polarizing beamsplitter is a wire-grid-polarizer polarizing beamsplitter comprising a transparent grid-support plate having an optically flat grid-support face and a wire-grid polarizer including a plurality of substantially linear electrical conductors disposed on the grid-support face of the plate, the electrical conductors extending substantially parallel to one another and being spaced apart from one another, the spacing between adjacent electrical conductors being less than a wavelength of visible light, the grid support plate and the grid-support face respectively constituting the polarizer-support plate and the polarizer-support face of the polarizing beamsplitter.

12. The digital-image projector according to any of claim 1, 2, or 3 in which the plate-supported, surface-mounted fixed-polarization-axis thin-polarizer polarizing beamsplitter is an alternating birefringent/nonbirefringent-film polarizer polarizing beamsplitter comprising a transparent film-support plate and an alternating birefringent/nonbirefringent-film polarizer mounted on an outer film-support face of the film-support plate, the alternating birefringent/nonbirefringent-film polarizer including alternating layers of oriented birefringent material and nonbirefringent material in which an index of refraction of the nonbirefringent material substantially equals one of the indices of refraction of the birefringent material, the film support plate and the film-support face respectively constituting the polarizer-support plate and the polarizer-support face of the polarizing beamsplitter.

13. The digital-image projector according to any of claim 1, 2, or 3 in which the polarizer-support face of the polarizer-support plate of the fixed-polarization axis polarizing beamsplitter is flat to within two wavelengths of visible light per inch.

14. The digital-image projector according to either of claim 1 or 2 in which the reflective digital-image-encoding polarization modulator is a reflective liquid crystal display (RLCD) or a liquid crystal on silicon display (LCoS).

* * * * *